US012678640B1

(12) United States Patent
Al Hani et al.

(10) Patent No.: US 12,678,640 B1
(45) **Date of Patent: *Jul. 14, 2026**

(54) FIREFIGHTER SAFETY HELMET SYSTEM

(71) Applicant: Imam Abdulrahman Bin Faisal University, Dammam (SA)

(72) Inventors: Shahad Mohammed Al Hani, Safwa (SA); Hala El-Wakeel, Dammam (SA); Hawra Alsaud, Safwa (SA); Mai Shukri, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/375,329

(22) Filed: Oct. 31, 2025

Related U.S. Application Data

(63) Continuation of application No. 19/090,708, filed on Mar. 26, 2025, now Pat. No. 12,491,388.

(51) Int. Cl.
*A42B 3/32* (2006.01)
*A62B 17/00* (2006.01)
(Continued)

(52) U.S. Cl.
CPC ............ *A62B 17/003* (2013.01); *A62B 18/04* (2013.01); *A62B 18/08* (2013.01); *A62B 23/02* (2013.01)

(58) Field of Classification Search
CPC ....... A62B 17/003; A62B 18/04; A62B 18/08; A62B 23/02
See application file for complete search history.

(56) References Cited

U.S. PATENT DOCUMENTS 3,362,403 A * 1/1968 Fleming ................. A42B 3/288 128/201.24
5,093,936 A * 3/1992 Copeland ................. A42B 3/28 2/9

(Continued)

FOREIGN PATENT DOCUMENTS

CN 212522765 U 2/2021
IN 202311039843 A 3/2024

OTHER PUBLICATIONS

Qiu, Yujia, "Smart firefighting technologies in Urban China", Fire Protection Engineering/Fire prevention, Aug. 9, 2018, 102 Pages.

(Continued)

*Primary Examiner* — Robert H Muromoto, Jr.
(74) *Attorney, Agent, or Firm* — Oblon, McClelland, Maier & Neustadt, L.L.P.

(57) ABSTRACT

A safety helmet for a firefighter includes an outer shield having a neck opening and a front opening, a hinge located on an upper region of the front opening of the outer shield, a fire-retardant foam liner, a face shield including a sensor carrier attached to the hinge, a particulate air filter, a light emitting diode (LED) light strip, a mask mechanism configured to attach to the tapered nose opening of the transparent screen and the particulate air filter, a heads-up display (HUD) connected to an upper region of a proximal edge of the mask mechanism which faces the tapered nose opening, an oxygen port connected to the mask mechanism, a mask body connected to a distal edge of the mask mechanism, a speaker and microphone unit attached to the mask body, and a regulator nose cone.

14 Claims, 15 Drawing Sheets

(51) Int. Cl.

| | |
|---|---|
| ***A62B 18/04*** | (2006.01) |
| ***A62B 18/08*** | (2006.01) |
| *A42B 3/04* | (2006.01) |
| *A62B 23/02* | (2006.01) |

(56) References Cited

U.S. PATENT DOCUMENTS

| | | | | |
|---|---|---|---|---|
| 5,129,108 | A * | 7/1992 | Copeland | A42B 3/20 2/9 |
| 5,701,606 | A * | 12/1997 | Aldridge | A41D 31/085 2/81 |
| 5,847,651 | A * | 12/1998 | Lu | A42B 3/046 340/689 |
| 6,711,748 | B2 * | 3/2004 | Paris | A41D 13/1209 2/422 |
| 9,179,209 | B2 * | 11/2015 | Emilsson | A42B 3/30 |
| 10,687,577 | B2 * | 6/2020 | Cadens Ballarin | A42B 3/122 |
| 12,491,388 | B1 * | 12/2025 | Al Hani | A62B 17/003 |
| 2010/0288273 | A1 * | 11/2010 | Sandlin | A62B 17/04 128/201.24 |
| 2019/0297985 | A1 * | 10/2019 | Weber | A42B 3/064 |
| 2021/0000210 | A1 * | 1/2021 | Lowe | A42B 3/10 |
| 2023/0029404 | A1 * | 1/2023 | Hall | A62B 18/084 |
| 2023/0166135 | A1 * | 6/2023 | Schmitt | A62B 7/10 128/202.26 |
| 2023/0201408 | A1 * | 6/2023 | Moubarak | A61L 9/20 128/863 |
| 2023/0414977 | A1 * | 12/2023 | Thompson | A62B 18/04 |

OTHER PUBLICATIONS

"What is Power Transfer Hinge", By Commercial Locks And Doors | Aug. 13, 2024 | Categories: Door Hardware, https://goolad.com/what-is-a-power-transfer-hinge/, 5 Pages/.

"What is Thermal Imaging? How a Thermal Image is Captured", Thermal imaging, Fundamentals, https://www.fluke.com/en-us/1earn/blog/thermal-imaging/how-infrared-cameras-work?srsltid=AfmBOoq_M2SPfe9Eeg8v-QuCbMvS7yONyWpriGly2T. , 12 pages.

* cited by examiner

FIREFIGHTER SAFETY HELMET SYSTEM

CROSS-REFERENCE TO RELATED APPLICATIONS

The present application is a Continuation of U.S. application Ser. No. 19/090,708, now allowed, having a filing date of Mar. 26, 2025.

BACKGROUND

Technical Field

The present disclosure is directed to fire safety equipment, and more particularly to a safety helmet for firefighters and a method of using the safety helmet.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Firefighting has become increasingly challenging due to the evolving nature of fire hazards in modern environments. Urbanization and industrialization have led to complex structures with dense populations, hazardous materials, and advanced electrical systems. High-rise buildings, chemical storage facilities, and factories present unique risks, including explosive materials, toxic gases, and the risk of structural collapse. In addition, residential and commercial spaces often include synthetic materials that, when burned, release highly toxic and carcinogenic fumes. Wildfires, exacerbated by climate change, pose another significant hazard, spreading rapidly across vast areas and threatening lives, property, and ecosystems. Therefore, firefighters must contend with intense heat, thick smoke, low visibility, and unpredictable conditions, making the work of firefighters extremely dangerous and life-threatening.

Fire safety equipment has traditionally focused on three primary areas including, protective gear, respiratory protection, and firefighting tools. Protective gear includes helmets, jackets, gloves, and boots made from heat-resistant materials to shield firefighters from flames and falling debris. Respiratory protection is provided by a self-contained breathing apparatus (SCBA), which supplies breathable air in smoke-filled environments. Firefighting tools such as axes, hoses, and ladders assist in search-and-rescue operations and fire suppression. Fire departments further employ standalone thermal imaging cameras for locating heat sources, and remote communication devices for coordination. However, despite advancements, existing safety equipment has limitations that hinder the performance of firefighters and compromise firefighter safety in extreme conditions. The limitations may include conventional helmets lacking integrated technologies to provide real-time information about the surrounding environment, such as temperature, oxygen levels, or the location of team members and victims. Furthermore, smoke and low-light conditions severely impact visibility since existing helmets provide only basic visors, which are prone to fogging and scratching, reducing their effectiveness in critical situations. Moreover, firefighters rely on handheld radios for communication, which are often cumbersome to operate in high-pressure scenarios and noise from fires and equipment can further distort audio, leading to miscommunication. In addition, SCBA systems are effective but bulky, restricting movement and adding to fatigue, further SCBA may not address particulate filtration, exposing firefighters to harmful airborne particles. Hence, traditional fire fighting gear is heavy and poorly designed for long-term use, causing discomfort and limiting mobility during extended operations. Given the challenges mentioned above, there is a requirement for advanced firefighting gear that integrates multiple functions into a single, ergonomic system.

U.S. Pat. No. 3,362,403A describes a protective flight helmet and unified oxygen breathing assembly including an outer, two-piece shell of hard, penetration resistant material shaped to cover a human head, said two piece shell forming front and rear shell halves hinged together at the top thereof to form a clam shell type entry. The shell has a close fitting neck opening, which is smaller than a head of the wearer, the front shell half including a full-face opening extending above a chin of the wearer to a brow of the wearer, a rigid, crushable inner lining covering the brow, crown, back and sides of the head of the wearer to said full-face opening. The flight helmet further includes a transparent visor conforming to the exterior contour of said full-face opening, means for pivotally mounting said transparent visor to said front shell half so that said visor may be raised above the head of the wearer, and lowered into position in front of said full-face opening. Furthermore, the flight helmet includes a pneumatic visor seal surrounding said full-face opening, an oxygen supply connected to the nose cone. The aforementioned reference has the faceplate hinged on the sides of the helmet, not at the top. However, there is no there is no light source, thermal camera, light sensor, display screen, GPS or communication unit for navigating within a fire area and communicating with other firefighters.

IN202311039843A describes a noise cancellation-enabled helmet designed for firefighters, which incorporates a built-in wireless headset with active noise cancellation, a GPS transmitter with distress signal functionality, a fire-resistant face shield, a flashlight with a pin hole camera, an infrared sensor, a fire-resistant neck shield, and a rechargeable power bank. Additional features include an oxygen mask, a panic beacon, a light sensor, and a gas mask. However, the above described reference does not mention that the faceplate is moveable, has a heads-up display or a communication unit for communicating with other firefighters.

Hence, each of the aforementioned references suffer from one or more drawbacks hindering their adoption. Accordingly, it is one object of the present disclosure to provide a safety helmet and a method of using the safety helmet that integrates real-time situational awareness and communication ability with head and neck protection in a firefighting environment.

SUMMARY

In an exemplary embodiment, a safety helmet for a firefighter is described. The safety helmet includes an outer shield having a neck opening and a front opening, a hinge located on an upper region of the front opening of the outer shield, and a fire-retardant foam liner having a lower opening and a face opening. The fire-retardant foam liner is configured to fit within the outer shield, where the fire-retardant foam liner is configured to extend past the neck opening. The safety helmet further includes a face shield including a sensor carrier attached to the hinge, where the sensor carrier has a shape configured to conform to the front opening, a transparent screen having a helmet facing edge configured to conform to the sensor carrier and a forward facing edge configured with a tapered nose opening, a particulate air filter connected to a lower edge of the transparent screen, and a light emitting diode (LED) light strip located between the sensor carrier and the helmet facing edge of the transparent screen. Furthermore, the face shield includes a mask mechanism configured to attach to the tapered nose opening of the transparent screen and the particulate air filter, a heads-up display (HUD) connected to an upper region of a proximal edge of the mask mechanism which faces the tapered nose opening, where the HUD display is configured to project a visual overlay onto the transparent screen. The face shield further includes an oxygen port connected to the mask mechanism, a mask body connected to a distal edge of the mask mechanism, a speaker and microphone unit attached to the mask body, and a regulator nose cone connected to the distal edge of the mask body.

In another exemplary embodiment, a method of using a safety helmet by a firefighter is described. The method includes donning a fire-retardant foam liner having a lower opening and a face opening, turning ON a power button, and placing an outer shield having a neck opening and a front opening over the fire-retardant foam liner. An interior surface of the outer shield includes a battery, a microcontroller, the power button and an internal wiring harness. The method further includes aligning the face opening with the front opening, aligning the lower opening and the neck opening, closing a face shield over the front opening by rotating a hinge located on an upper region of the front opening of the outer shield, where the hinge is connected to the face shield, placing a neck and shoulders protector around a neck of the firefighter, securing the neck and shoulders protector by attaching a first strap configured with hook fasteners to a second strap configured with loop fasteners, and connecting a source of oxygen to an oxygen port in a mask mechanism of the face shield.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
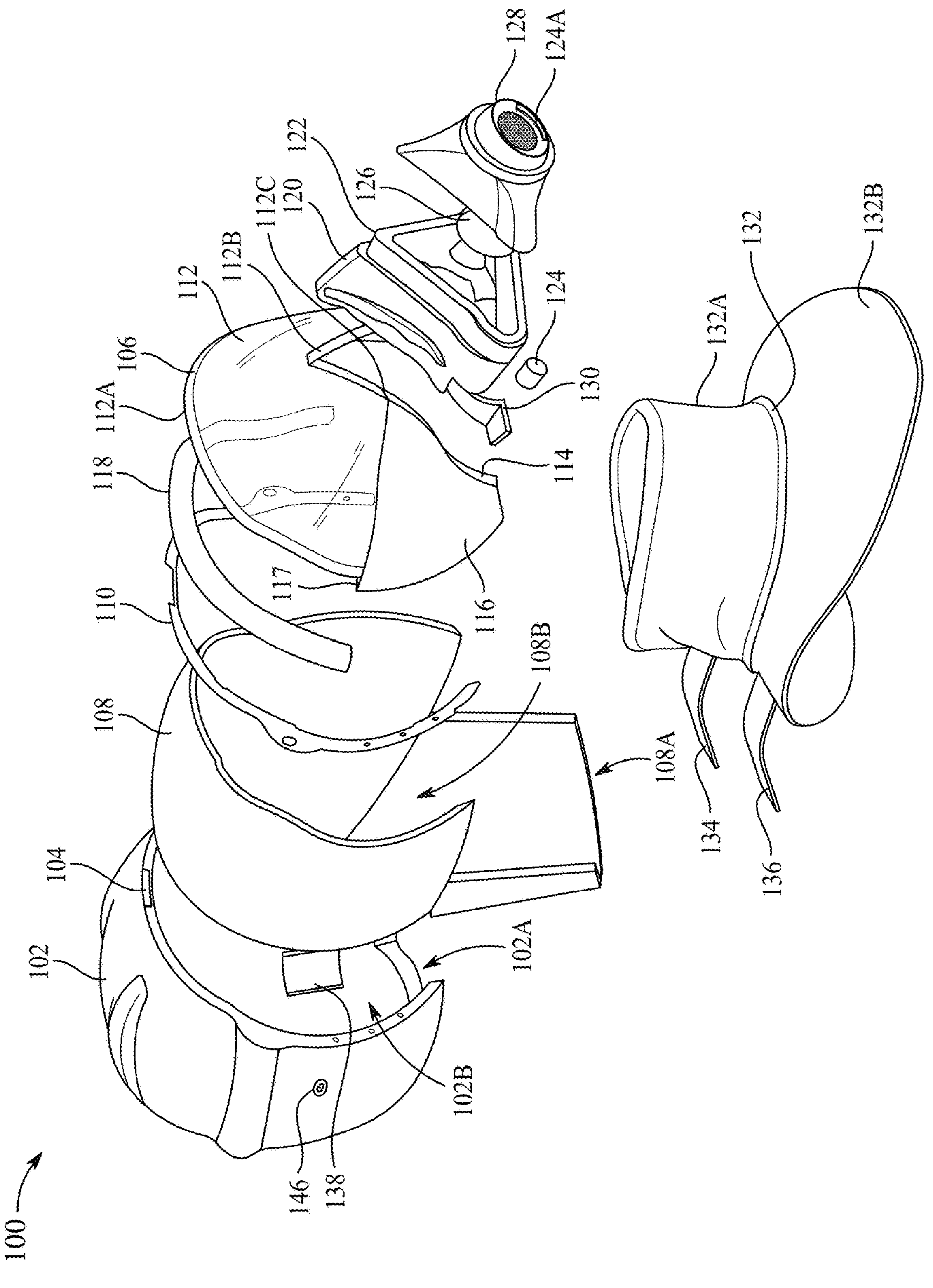
FIG. 1A illustrates a schematic exploded view of a safety helmet, according to certain aspects.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

Aspects of this disclosure are directed to a safety helmet for firefighters and a method of using the safety helmet by a firefighter. The safety helmet and the method as described herein, utilize advanced materials and construction principles, while incorporating a plurality of smart components such as sensors, cameras, and microcontrollers. The safety helmet and the method may provide enhanced fire safety and ease of operation to firefighters through one or more sensor inputs, real time information availability, and on-board communications system. This approach addresses limitations in conventional fire safety equipment, including standard gear for the firefighters.

The term “proximal” is defined as a position on the helmet near the face of the user.

The term “distal” is a position on the helmet downstream or on a part away from the face of the user.

Referring to FIG. 1A, illustrated is an exploded perspective view of a safety helmet 100, in accordance with certain aspects of the present disclosure. The safety helmet 100 includes an outer shield 102 having a neck opening 102A and a front opening 102B. In an aspect, the outer shield 102 has an oval shape truncated by the neck opening 102A. However the shape may be modified based on a requirement of a firefighter or customized to accommodate other firefighting equipment. Further, the safety helmet 100 includes a hinge 104, located on an upper region of the front opening 102B of the outer shield 102. The safety helmet 100 further includes a face shield 106. In particular, the hinge 104 is a power transfer hinge which is configured to provide a movable mechanical coupling between the outer shield 102, and the face shield 106 of the safety helmet 100. Generally, a power transfer hinge is a specially designed hinge that allows a mechanical connection between two moving parts, while also serving as an electrical conduit for transferring power and signals. The hinge 104 is configured to be equipped with embedded conductive pathways or contacts that enable electrical signals and power to flow between the key components of the safety helmet 100.

As illustrated in FIG. 1A, the safety helmet 100 includes a fire-retardant foam liner 108 having a lower opening 108A and a face opening 108B. In an aspect, the fire-retardant foam liner 108 is configured to fit within the outer shield 102. Further, the fire-retardant foam liner 108 is configured to extend past the neck opening 102A. The fire-retardant foam liner 108, as described herein, is configured to provide thermal insulation, physical cushioning, and enhanced safety against extreme heat, which in turn may protect a wearer from intense heat, flames, and impacts encountered during firefighting operations. The fire-retardant foam liner 108 may ensure that the safety helmet 100 fits securely and comfortably, reducing fatigue during long operations. In some aspects, the fire-retardant foam liner 108 is constructed using lightweight materials which may include, but not limited to, phenolic foam, silicone foam, polyamide foam, and expandable graphite foam. In one aspect of the present disclosure, the fire-retardant foam liner 108 may be made of Nomex®, due to its excellent flame retardancy, good energy absorption properties, and lightweight nature. In another example, the fire-retardant foam liner 108 may be constructed of closed-cell foam, which maintains its shape and provides consistent cushioning even when exposed to water. The fire-retardant foam liner 108 is manufactured using a die cutting process, including pre formed fire-retardant foam sheets, that are cut into desired shape using the die cutting process. In one aspect, the fire-retardant foam liner 108 has a width of about 240 mm, a length of about 256 mm and a height of about 294.4 mm.

The face shield 106 includes a sensor carrier 110 attached to the hinge 104. Further, the sensor carrier 110 has a shape configured to conform to the front opening 102B. Specifically, the sensor carrier 110 is designed to allow smooth and uninterrupted movement of the hinge 104, so the wearer may fasten the safety helmet 100 without delay in emergency situations. The face shield 106 further includes a transparent screen 112 having a helmet facing edge 112A configured to conform to the sensor carrier 110 and a forward-facing edge 112B configured with a tapered nose opening 114. In one aspect, the transparent screen 112 is manufactured using durable, high impact resistant, optically clear, and scratch resistant materials such as Trivex plastic. In another aspect, the transparent screen 112 is fabricated from high-durability, optically clear materials such as polycarbonate or reinforced glass and is coated with an anti-glare and anti-scratch surface treatment to ensure optimal visibility and durability under varying environmental conditions. The transparent screen 112 has a thickness of about 10 mm, a width of about 240 mm and a height of about 136.2 mm. However, in some aspects, the dimensional specifications of the transparent screen 112 and the material of choice may be different from the aforementioned, to better suit a custom requirement of the wearer. Furthermore, to tackle smoke and highly toxic fumes during certain emergent situations, the face shield 106 of the safety helmet 100 is configured to include a particulate air filter 116, connected to a lower edge 112C of the transparent screen 112. In one aspect, the safety helmet 100 includes a gasket 117 located between the lower edge 112C of the transparent screen 112 and the particulate air filter 116. The gasket 117 is configured to provide a leak proof seal between the particulate air filter 116 and the transparent screen 112. According to the present disclosure, the gasket 117 is manufactured using high heat-resistant silicone material. In an aspect, the particulate air filter 116 may be a high-efficiency particulate air (HEPA) filter. In general, HEPA filters are highly efficient at capturing airborne particles, including smoke, dust, and other contaminants present in firefighting environments. HEPA filters may provide superior respiratory protection with ease of breathing, while being highly reliable, durable, and effective. The particulate air filter 116 is configured to conform to the lower edge 112C of the transparent screen 112 and hence has a width of about 240 mm and a length of about 106 mm. In some implementations of the present disclosure, the manufacturing process of the particulate air filter 116 for the safety helmet 100 included media preparation which involved fiber selection, layering, and pleating.

As illustrated in FIG. 1A, the safety helmet 100 includes a light emitting diode (LED) light strip 118, referred to as the "LED light strip 118", hereinafter for brevity in explanation. The LED light strip 118 is located between the sensor carrier 110 and the helmet facing edge 112A of the transparent screen 112. In one implementation of the present disclosure, the LED light strip 118 has a width of about 240 mm, a length of about 136.5 mm, and a thickness of about 10 mm. Specifically, the LED light strip 118 is configured to conform to the sensor carrier 110 and the face shield 106 to provide a seamless fit and leakproof operations. In particular, LEDs are included in the LED light strip 118 since LEDs have high energy efficiency, long lifespan, and compact size. LEDs provide bright illumination without generating excessive heat, crucial for maintaining wearer comfort. LEDs may further offer versatility in terms of color temperature and intensity, allowing for customized lighting solutions. Additionally, LEDs are environmentally friendly compared to traditional lighting sources, as they consume less energy and contain no hazardous materials such as mercury. The face shield 106 further includes a mask mechanism 120. In one aspect, the mask mechanism 120 is configured to attach to the tapered nose opening 114 of the transparent screen 112 and the particulate air filter 116. The mask mechanism 120 is constructed using a fiberglass reinforced plastic (FRP) since FRP offers a balance of strength, heat resistance, and lightweight properties. FRP has a high strength-to-weight ratio, which provides the ability to withstand harsh conditions. In one implementation, the mask mechanism 120 is manufactured using a resin transfer molding (RTM) method where a resin is injected into a mold containing fiberglass reinforcements, to produce final product. The face shield 106 includes a mask body 122 which is connected to a proximal edge of the mask mechanism 120. In one implementation of the present disclosure, the mask body 122 has a width of about 59 mm, a length of about 75.11 mm, and a height of about 83.5 mm. The mask body 122 is configured to mechanically couple with the mask mechanism 120 in an air-tight manner. As such, a joint between the mask mechanism 120 and the mask body 122 includes a silicon seal. Further, the mask mechanism 120 is configured with an oxygen port 124. In particular, the oxygen port 124 is connected to the mask mechanism 120. The oxygen port 124 is configured to receive an oxygen supply from external oxygen reservoir. In one aspect, an oxygen sensor 124A is connected between the mask mechanism 120 and an air valve 124B (shown in FIG. 1B) in the oxygen port 124. The oxygen sensor 124A is configured to measure ambient oxygen levels and actuate the air valve 124B based on the ambient oxygen levels. The air valve 124B may be configured with default open and close positions, with certain provisions for partial opening of the air valve 124B, which provides a tailored and appropriate air flow to the wearer of the safety helmet 100, based on an input received from the oxygen sensor 124A.

As illustrated in FIG. 1A, the face shield 106 of the safety helmet 100 includes a speaker and microphone unit 126 and a regulator nose cone 128. In one aspect, the speaker and microphone unit 126 is attached to the mask body 122 and the regulator nose cone 128 is attached to the distal edge of the mask body 122. The regulator nose cone 128 of the present disclosure is configured to perform multiple functions depending upon a severity of the situation. The regulator nose cone 128 may allow for manual air flow adjustment to override oxygen sensor control and is configured to mechanically couple with the mask body 122. As such, a sealing arm 130 is located within the regulator nose cone 128. The sealing arm 130 is configured to press the mask body 122 against the mask mechanism 120 when the oxygen sensor 124A detects air flow through the air valve 124B. The sealing arm 130 thus ensures that the mask mechanism 120, the mask body 122, and the regulator nose cone 128, form a collective air-tight seal which prevents any unwanted gases to pass through. The air-tight seal further enhances the efficacy of the safety helmet 100, in multiple use case scenarios which are common during firefighting operations. Furthermore, as can be seen from FIG. 1A, the safety helmet 100 includes a neck and shoulders protector 132. In one aspect, the neck and shoulders protector 132 is included as an accessory to the safety helmet 100, which may be required for certain operations. The neck and shoulders protector 132 is worn below the safety helmet 100 and above a chest area of the wearer. In some aspects, the neck and shoulders protector 132 is made of heat resistant and penetration resistant fiber. The heat resistant and penetration resistant fiber may be a mixture of Nomex® and Kevlar®. However, in some aspects, the materials may be different from the aforementioned, as per the technological and methodological advancements in fabric engineering. The neck protector includes a neck protection region 132A and a shoulder protection region 132B, configured to protect a neck of the wearer and shoulders of the wearer. Further, the neck protection region 132A includes has a first strap 134 and a second strap 136 and each strap of the first strap 134 and the second strap 136 includes one of a strip of hook and loop fastener configured to lock the neck protector in place when connected. A hook strip portion and a loop strip portion of the hook and loop fastener, each fabricated from a flexible material are integrally designed to interlock upon contact, where the alignment of the hook and loop strips facilitates secure attachment.

Figure 1B:
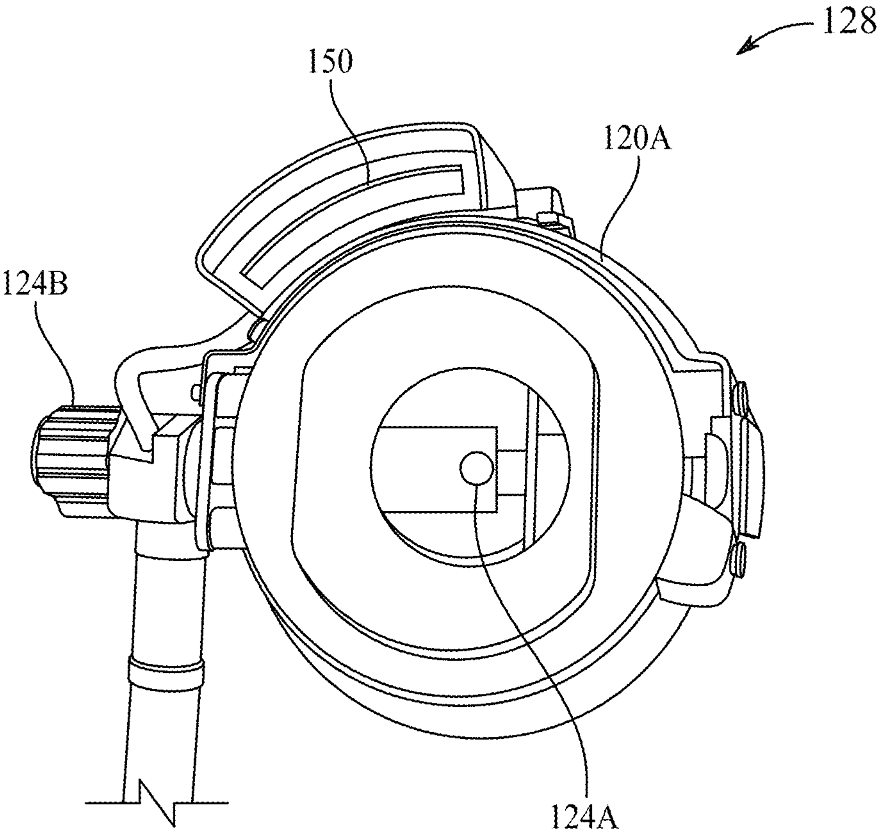
FIG. 1B illustrates a schematic diagram of a regulator nose cone of the safety helmet, according to certain aspects.
Figure 1C:
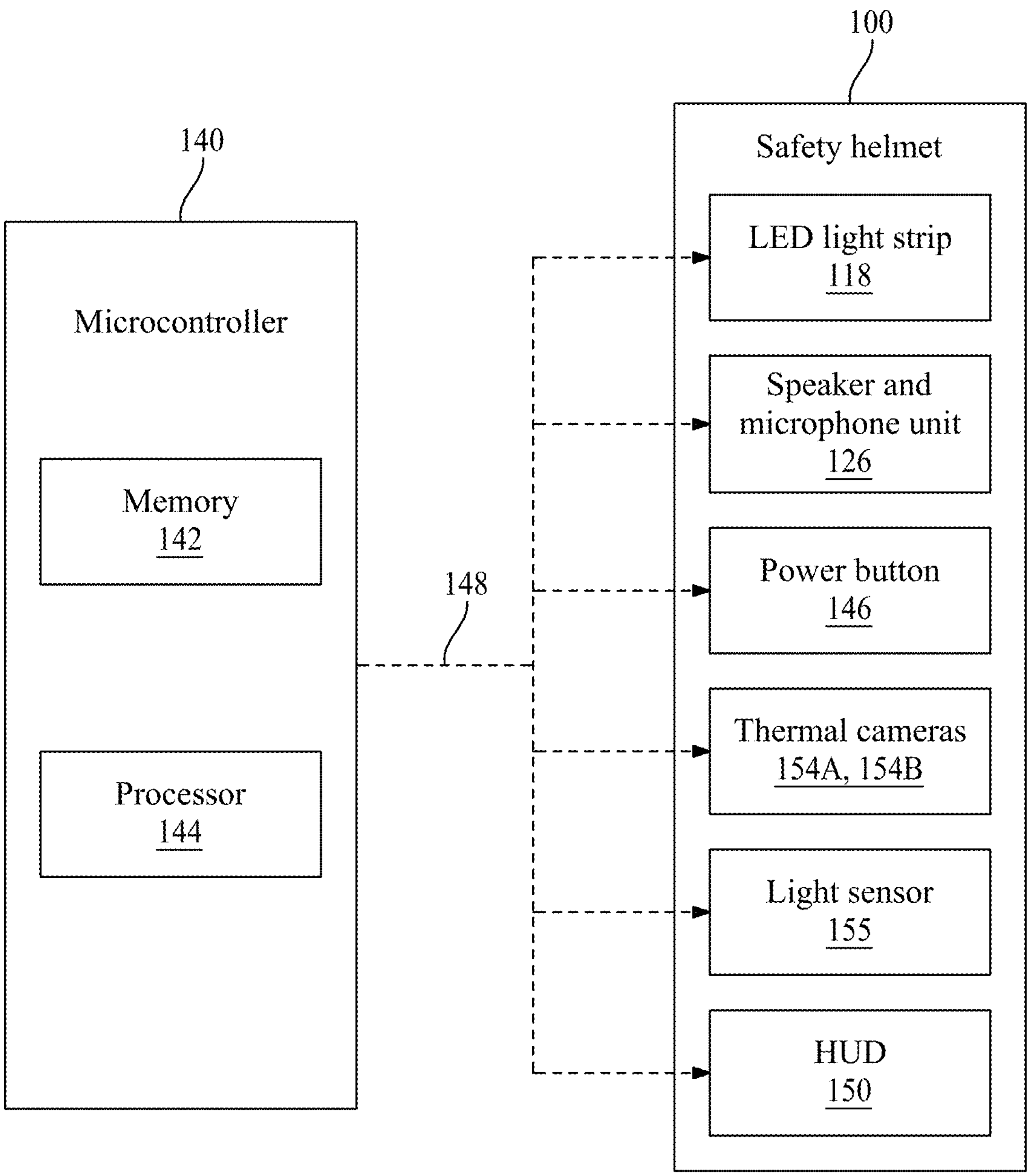
FIG. 1C illustrates a schematic block diagram of a computing system of the safety helmet, depicting a plurality of electrical components, according to certain aspects.

Further, as can be seen from FIGS. 1A and 1C, the safety helmet 100 includes a rechargeable battery 138. In one aspect, the rechargeable battery 138 is securely mounted to an inner surface of the outer shield 102. In another aspect, the rechargeable battery 138 may be disposed between the outer shield 102 and the fire-retardant foam liner 108. The rechargeable battery 138 is configured to supply power to a plurality of electrical components within the safety helmet 100. In addition, the safety helmet 100 includes a microcontroller 140, which is operatively connected to the rechargeable battery 138. As shown in FIG. 1C, the microcontroller 140 includes an electrical circuitry, a memory 142 for storing program instructions, and at least one processor 144 configured to execute the program instructions to control and manage the operation of various electronic functionalities integrated into the safety helmet 100. Moreover, the safety helmet 100 includes a power button 146, electrically connected to the microcontroller 140. The power button 146 facilitates manual activation and deactivation of the electrical circuitry, enabling wearer to control the functionalities provided in the safety helmet 100. In one implementation, the power button 146 is disposed on a side of the safety helmet 100. However, in some aspects, the power button 146 may be disposed on another location on the safety helmet, which is accessible to use by the firefighter while wearing firefighting gear. Additionally, in some aspects, the safety helmet 100 includes a wiring harness 148 with a plurality of electrical terminals, which establish electrical connections between the microcontroller 140, the rechargeable battery 138, the LED light strip 118 and other electronic components, ensuring efficient power distribution and signal communication. The wiring harness 148 is designed to minimize interference and improve durability, with insulation materials and protective sheathing that may provide resistance to environmental conditions such as moisture, temperature extremes, and physical wear.

The rechargeable battery 138 is configured to support extended use by providing sufficient energy storage capacity and may include a charging port or wireless charging capability to enable convenient recharging. The charging port may be integrated with the safety helmet 102 for ease in recharging the rechargeable battery 138 when the safety helmet 102 is not in use. The microcontroller 140, in conjunction with the memory 142 and the processor 144, is designed to support advanced features such as automated system diagnostics, battery level monitoring, and programmable functionalities tailored to specific use cases. Furthermore, the electrical circuitry of the microcontroller 140 is configured to integrate seamlessly with external components, such as the speaker and microphone unit 126 or the LED light strip 118 to electrically connect and protect these components of the safety helmet 100. The safety helmet 100 and associated electrical components are engineered to ensure reliability, user comfort, and compliance with safety standards for protective headgear.

Referring to FIG. 1B, illustrated is a schematic view of the regulator nose cone 128, depicting a back side of the regulator nose cone 128, in conjunction with additional components. The regulator nose cone 128 is an integral component of the safety helmet 100 and is thereby configured to integrate a plurality of elements therein. As such, the regulator nose cone 128 of the safety helmet 100 includes a heads-up display (HUD) 150. The HUD 150 is mounted to an upper region 120A of a proximal edge of the mask mechanism 120, specifically positioned to face the tapered nose opening 114. The HUD 150 is operatively connected to the microcontroller 140 and is configured to project a visual overlay onto the transparent screen 112. The HUD 150 is designed to provide real-time visual information to the wearer without obstructing the line of sight, thereby enhancing situational awareness and safety.

The HUD 150 is further configured to allow user-specific adjustments, including brightness, focus, and content customization, facilitated through the program instructions included in the microcontroller 140. The connection between the HUD 150 and the microcontroller 140 is established via the wiring harness 148 described above, and the HUD 150 is powered by the rechargeable battery 138, with power management protocols implemented to optimize energy consumption. The HUD 150 is engineered to comply with applicable safety and performance standards, ensuring reliable operation, user comfort, and ergonomic design. The HUD 150 incorporates voice control interfaces and an augmented reality (AR) module, which provides firefighters with an enhanced visual overlay directly on the HUD screen. This AR system is designed to display vital information such as navigation aids, hazard indicators, and victim locations, directly in the user's field of view. This approach improves situational awareness and decision-making by integrating real-time data with the physical environment the firefighter is navigating.

Referring to FIG. 1C, an exemplary schematic block diagram of a plurality of electrical and functional components of the safety helmet 100 is illustrated. In particular, FIG. 1C depicts the microcontroller 140, the memory 142, the processor 144, and associated components. The microcontroller 140 is operatively connected to the memory 142, which is configured to store program instructions, and the processor 144, which is configured to execute the stored program instructions to facilitate the coordination and operation of the various integrated systems of the safety helmet 100. As depicted in FIG. 1C, the microcontroller 140 is electrically connected to the power button 146, which serves as the primary activation mechanism for the operational functionalities of the safety helmet 100.

Figure 2A:
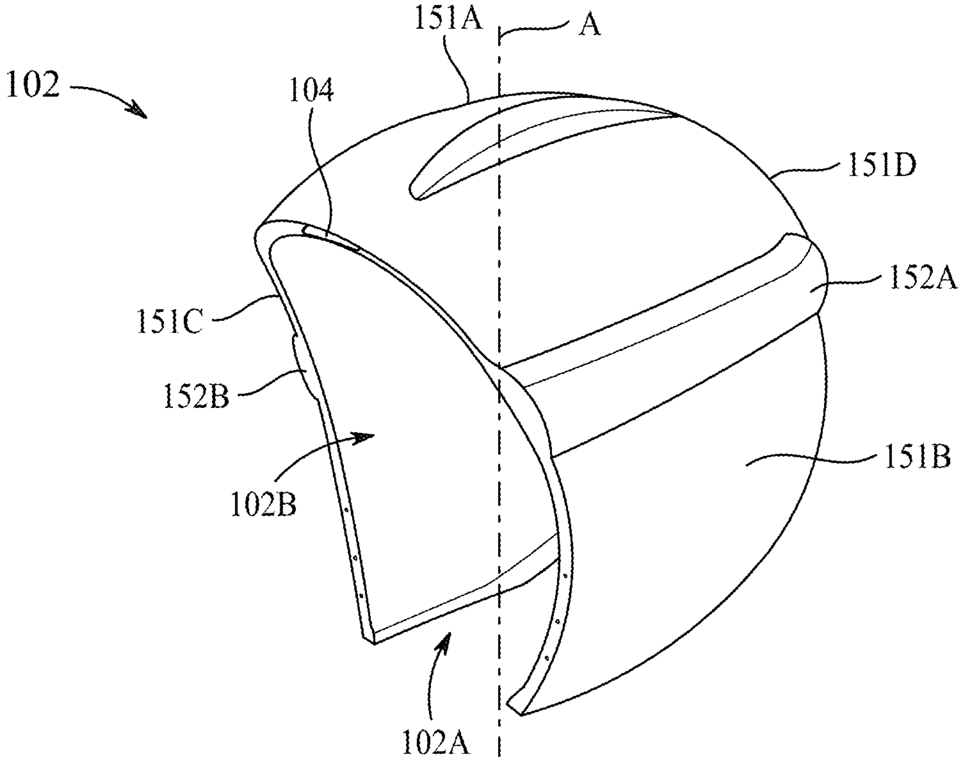
FIG. 2A illustrates a schematic perspective view of an outer shield of the safety helmet, according to certain aspects.

FIG. 2A is a schematic side perspective view of the outer shield 102 of the safety helmet 100 and describes a plurality of provisions for safety helmet design. The outer shield 102 has the oval shape truncated by a top 151A, a first side 151B, a second side 151C opposite the first side 151B, and a back side 151D opposite the front opening 102B, with a central axis 'A' extending longitudinally from the top 151A of the outer shield 102 to the neck opening 102A, to provide symmetrical alignment. The symmetrical alignment of the components with respect to the central axis 'A' and a line perpendicular to 'A' ensures an even weight distribution of components, which serves to reduce firefighter fatigue and pain at pressure points during extended wear. The outer shield 102 further includes a first thickened band 152A located on the first side 151B about one-half of a distance from the top 151A of the outer shield 102 and the neck opening 102A. In particular, the first thickened band 152A extends from the back side 151D to the front opening 102B. The first thickened band 152A is configured to enhance structural rigidity and impact resistance on the first side 151B and is manufactured using high-strength materials such as reinforced polymers or composite thermoplastics to distribute impact forces evenly. Similarly, a second thickened band 152B is positioned on the second side 151C, symmetrically aligned with the first thickened band 152A. In particular, the second thickened band 152B is located on the second side 151C about one-half distance from the top 151A of the outer shield 102 and the neck opening 102A. Further, the second thickened band 152B extends from the back side 151D to the front opening 102B, to provide comparable reinforcement and resistance to mechanical stress. In addition, the safety helmet 100 includes a wiring channel located within the second thickened band 152B. As such, the second thickened band 152B incorporates the wiring channel which is integrally formed, configured to contain a plurality of wires of the wiring harness 148. The wiring channel is configured to prevent mechanical damage, with dimensions and insulation to accommodate various wire gauges while maintaining signal integrity under operational conditions. The wiring channel shields the wires from environmental factors such as moisture, debris, and temperature variations, ensuring durability and reliability of the electrical circuit connections. The combination of the thickened bands 152A, 152B, and the wiring channel provides structural integrity, shock absorption, and electronic functionality while providing a lightweight and ergonomic design, to the safety helmet 100.

Figure 2B:
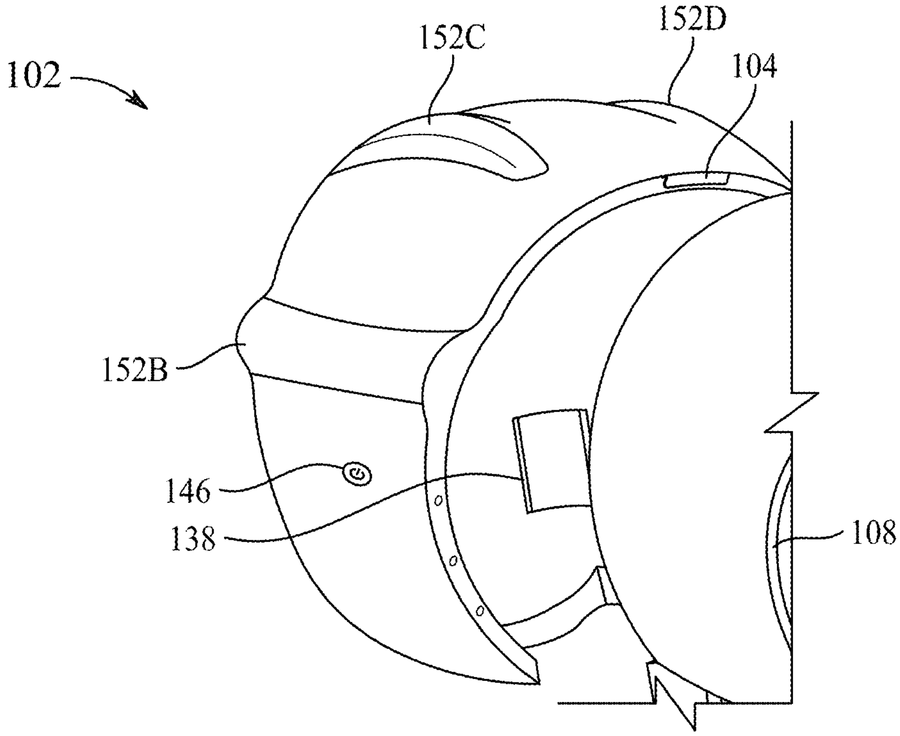
FIG. 2B illustrates another schematic perspective view of the outer shield of the safety helmet, according to certain aspects.

FIG. 2A is a front and side schematic perspective view of the outer shield 102 of the safety helmet 100 of the outer shield 102 of the safety helmet 100. In particular, FIG. 2B describes additional thickened bands disposed on the top 151A of the outer shield 102. As can be seen from FIG. 2B, the outer shield 102 further includes a third thickened band 152C and a fourth thickened band 152D. The third and the fourth thickened bands 152C, 152D are located on the top 151A of the outer shield 102, extending from the back side 151D to the front opening 102B. ending just before an edge of the front opening 102B. The functional specifications of the third and the fourth thickened bands 152C, 152D remain identical to the first and the second thickened bands 152A, 152B. The thickened bands 152C, 152D provide additional structural support to the top of the safety helmet 100 in the event of falling debris in the vicinity of the firefighter.

Figure 2C:
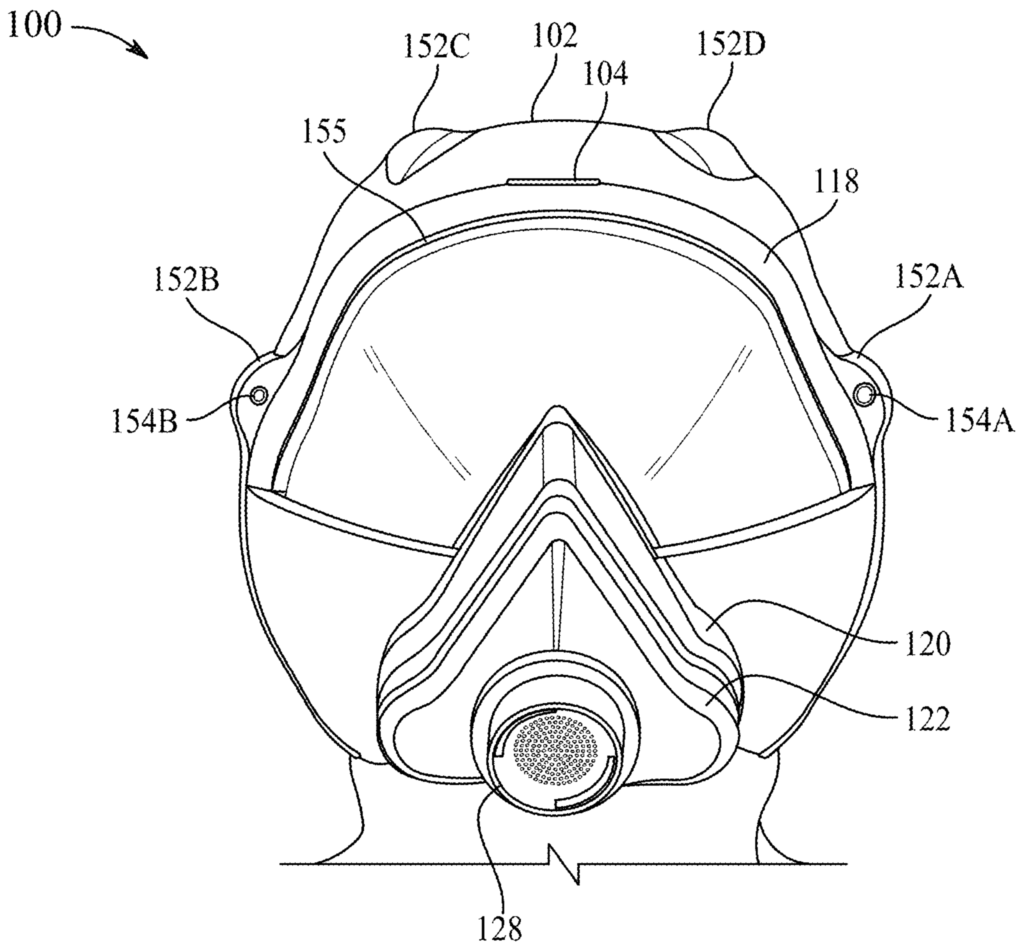
FIG. 2C illustrates a front view of the safety helmet, according to certain aspects.

FIG. 2C illustrates a front view of the safety helmet 100. In particular, FIG. 2C provides the front view of safety helmet 100 with all components included therein, for a complete assembly of the safety helmet 100. The sensor carrier 110 of the safety helmet 100 is visible in FIG. 2B. In some embodiments, the sensor carrier 110 includes a first forward-facing thermal camera 154A and a second forward-facing thermal camera 154B, each positioned to enhance the functionality and safety features of the safety helmet 100. The first forward-facing thermal camera 154A and the second forward-facing thermal camera 154B may be interchangeably referred to as "the first and the second forward facing thermal cameras 154A, 154B, forward facing thermal cameras 154A, 154B, and thermal cameras 154A, 154B", hereinafter without limitation. The first forward-facing thermal camera 154A is configured to cover an end of the first thickened band 152A located on the front opening on the first side 151B, while the second forward-facing thermal camera 154B is configured to cover an end of the second thickened band 152B, located on the front opening on the second side 151C. Each forward-facing thermal camera of the first and the second thermal cameras 154A, 154B is configured to measure the ambient temperatures in an environment surrounding the sensor carrier 110 and turn on when the ambient temperature exceeds a threshold temperature. Upon activation, each thermal camera of the first and the second thermal cameras 154A, 154B is further configured to record infrared images of the environment and project a real-time infrared display onto the transparent screen 112 via the HUD 150. The aforementioned feature allows the wearer to visualize heat signatures in the environment, thereby enhancing situational awareness, particularly in low-visibility, high smoke, and high-temperature scenarios. The first and the second thermal cameras 154A, 154B are electrically connected to the wiring harness 148 described above, specifically the first forward facing thermal camera 154A is connected to a first set of wires and the second forward facing thermal camera 154B is connected to a second set of wires, through the hinge 104. The connection through the hinge 104 (power transfer hinge) ensures reliable power supply and data transmission between the first and the second thermal cameras 154A, 154B and the microcontroller 140.

The first and the second thermal cameras 154A, 154B are housed within impact-resistant enclosures within the first and the second thickened bands 152A, 152B, with the camera "eyes" protruding through the sensor carrier at 154A and 154B, to ensure durability and continued functionality under operational stresses. The safety helmet 100 is calibrated to maintain accuracy and responsiveness, with the threshold temperature and display settings customizable via the program instructions stored in the memory 142. The integration of the forward-facing thermal cameras 154A, 154B into the safety helmet 100 may add vital real-time thermal imaging capability, making the safety helmet 100 suitable for applications in hazardous environments such as firefighting, industrial operations, or search-and-rescue missions.

As illustrated in FIG. 2C, the sensor carrier 110 further includes a light sensor 155 integrally mounted within a structure of the sensor carrier 110 and configured to enhance the environmental awareness capabilities of the safety helmet 100. The light sensor 155 is electrically connected by a third set of wires of the plurality of wires to the microcontroller 140 through the hinge 104 to maintain signal transmission and power supply to the light sensor 155. The light sensor 155 is configured to detect an intensity of an ambient light in an environment surrounding the light sensor 155 and generate a light intensity signal, correspondingly. The light intensity signal is transmitted to the microcontroller 140, where the light intensity is processed using pre-stored program instructions to adjust functionalities of the safety helmet 100 dynamically. In addition, data from the light sensor 155 may be used to enhance the functionality of the HUD 150 by automatically adjusting a brightness and a contrast of the HUD 150 in order to maintain clarity of the visual overlay projected onto the transparent screen 112. In some implementations, the light sensor 155 may be housed in a durable, weather-resistant enclosure within the sensor carrier 110, providing protection against environmental factors such as moisture, dust, and extreme temperatures. The design and placement of the light sensor 155 are optimized to ensure unobstructed exposure to ambient light for accurate readings. Furthermore, inclusion of the light sensor 155 and subsequent integration with other electronic components within the safety helmet 100 provide the wearer with advanced adaptive features, rendering the safety helmet 100 suitable for a wide range of hazardous conditions.

In some aspects, the LED light strip 118 is electrically connected by a fourth set of wires of the plurality of wires to the microcontroller 140, through the hinge 104 to provide reliable power delivery and signal transmission. The microcontroller 140 is configured to receive the light intensity signal generated by the light sensor 155, and dynamically control an operation of the LED light strip 118 based on the detected ambient light conditions. Specifically, the microcontroller 140 is configured to turn the LED light strip 118 ON when the light intensity signal indicates that the ambient light level is below a light intensity threshold, thereby providing enhanced illumination for the wearer in low-light environments. Conversely, the microcontroller 140 turn the LED light strip 118 OFF when the light intensity signal indicates that the ambient light level is greater than or equal to the light intensity threshold, ensuring energy conservation and preventing unnecessary illumination in well-lit conditions. The LED light strip 118, positioned between the sensor carrier 110 and the helmet facing edge 112A of the transparent screen 112, is designed for high-efficiency illumination, incorporating energy-saving LED technology to maximize battery life while providing sufficient brightness for safe operation in dark environments. Further, the dynamic control of the LED light strip enhances the usability and adaptability of the safety helmet 100, providing real-time adjustment to changing ambient light conditions without requiring wearer intervention.

Further, the HUD 150 is electrically connected by a fifth set of wires of the plurality of wires to the microcontroller 140 through the hinge 104. The fifth set of wires is integrated into the wiring harness 148 of the safety helmet 100 by utilizing the hinge 104 to facilitate electrical connectivity while maintaining the flexibility required for dynamic movements of components of the safety helmet 100. The microcontroller 140, connected to the HUD 150 via the fifth set of wires, processes data from the light sensor 155 and the thermal camera 154A, 154B, integrated into the safety helmet 100, including the light sensor, and transmits the processed data to the HUD 150, permitting the HUD 150 to project essential information such as ambient temperature readings, oxygen levels, infrared imaging, and navigation cues directly onto the transparent screen 112. In particular, the HUD 150 incorporates temperature measurements from the first forward facing thermal camera 154A and the second forward facing thermal camera 154B. The HUD 150 further incorporates a real-time location of the firefighter within a building, determined using a compatible location tracking system, such as GPS, and displays the locations of other firefighters in proximity. Additionally, the HUD 150 provides the location of a victim, derived from thermal imaging, and overlays this information on the transparent screen 112. Furthermore, the HUD 150 includes a navigation aid for guiding the firefighter through the building, with directional cues and positional awareness mapped in augmented reality. A time display is integrated into the visual overlay to assist with time-sensitive operations. The HUD 150 incorporates readings by the oxygen sensor 124A located in the oxygen port 124, providing continuous monitoring of an air supply of the firefighter. Light intensity measurements from the light sensor 155 and infrared images captured by the first and the second forward facing thermal cameras 154A, 154B are included in the visual overlay, offering comprehensive visibility in low-light or high-temperature conditions. In an aspect, the visual overlay projected by the HUD 150 may be updated by connecting a communication unit integrated with the microprocessor to a computing application stored in a cloud 930 (see FIG. 9) in order to provide more clarity and relevance under varying operational requirements.

The safety helmet 100 is equipped with advanced wireless communication capabilities, providing firefighters with real-time access to critical information. This includes augmented reality overlays for navigation, building layouts, hazard identification, and environmental data such as weather conditions. Additionally, the helmet integrates a live-view system, allowing constant monitoring and seamless communication with command centers during emergencies. These features are designed to ensure rapid interventions, enhanced situational awareness, and safer, more efficient firefighting operations.

Further electrical connections within the safety helmet 100 include the speaker and microphone unit 126 electrically connected to the microcontroller 140 via a sixth set of wires of the plurality of wires through the hinge 104. The aforementioned electrical coupling provides real-time audio communication. The speaker and microphone unit 126 is specifically disposed within the mask body 122 to allow clear and efficient transmission of audio signals while minimizing external noise interference. The microphone of the speaker and microphone unit 126 is configured to capture a voice of the firefighter and transmit it to the microcontroller 140, which processes the audio signal, providing communication capability with other team members or a command centre. Subsequently, the speaker and microphone unit 126 is designed to relay incoming audio signals from the microcontroller 140 to the firefighter. In some implementations, the microphone may be equipped with noise-cancellation technology to filter out background noise such as ambient sounds from the environment, including fire crackling or machinery.

Figure 3A:
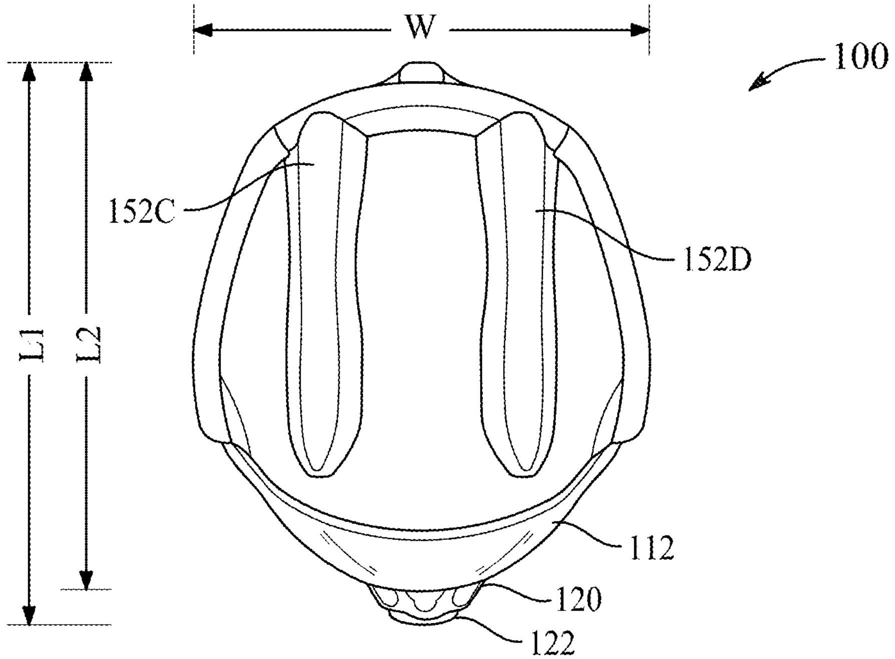
FIG. 3A illustrates a schematic diagram depicting a top view of the safety helmet, according to certain aspects.
Figure 3B:
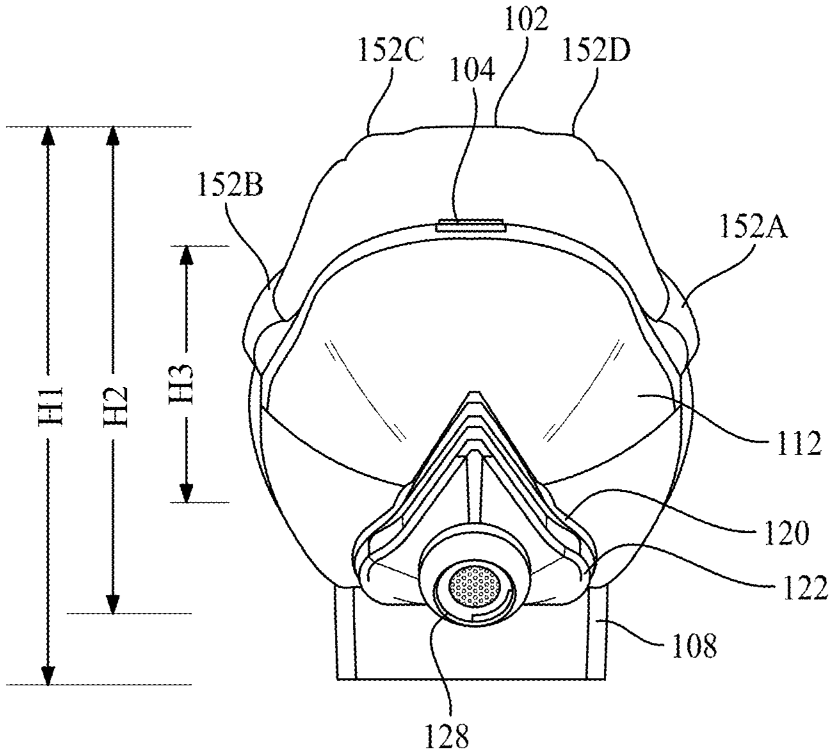
FIG. 3B illustrates a schematic diagram depicting a front view of the safety helmet, according to certain aspects.
Figure 3C:
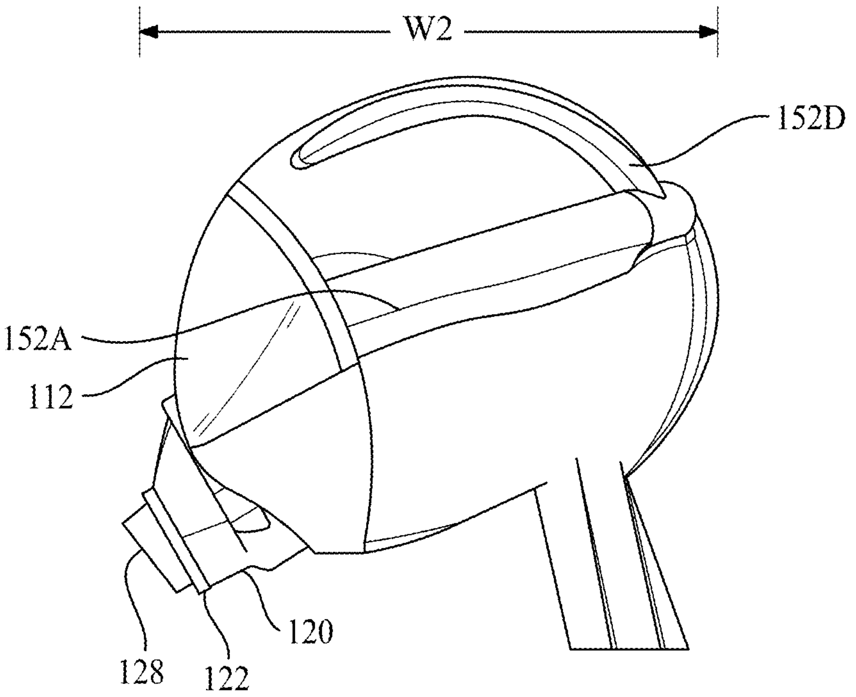
FIG. 3C illustrates a schematic diagram depicting a side view of the safety helmet, according to certain aspects.

FIG. 3A, FIG. 3B, and FIG. 3C are schematic diagrams of a top view, a front view, and a side view, respectively, of the safety helmet 100. In particular, FIG. 3A depicts a total length 'L1' of the safety helmet 100. In one implementation, the safety helmet 100 has a total length 'L1' of about 296.30 mm. The total length 'L1' is defined between a thickened bank located on the back side 151D of the outer shield 102 and a forward-most point of the regulator nose cone 128. A length 'L2' of the safety helmet 100 without the regulator nose cone 128 is about 278.80 mm, and a total width 'W' of the safety helmet 100, defined between the first thickened band 152A and the second thickened band 152B in a horizontal plane, is about 240 mm. Further, as can be seen from FIG. 3B, a total height 'H1' of the safety helmet 100 is about 294.40 mm. The total height 'H1' includes the height of the safety helmet 100 including the neck protector of the neck and shoulders protector 132. A height 'H2' of the safety helmet 100 is about 256 mm. The height 'H2' is defined between a top 151A of the outer shield 102 and a lower edge of the outer shield 102 below the neck opening 102A. Furthermore, a height 'H3' of the safety helmet 100, defined between the hinge 104 and about mid-way to the particulate air filter 116 in a vertical plane, is about 136.20 mm. Referring to FIG. 3C, the schematic side view of the safety helmet 100, depicting a width 'W2' of the safety helmet 100, is provided. The width 'W2' is defined between the back side 151D and the mask body 122 of the safety helmet 100 in a horizontal plane, and is around 294 mm. However, it may be noted that the dimensional specifications described herein and depicted in FIGS. 3A-3C are exemplary and non-limiting. In certain aspects, the dimensions of the safety helmet 100 may be customized to suit the specific requirements of a wearer, thereby providing an optimal fit and ensuring the intended functionality.

Figure 4:
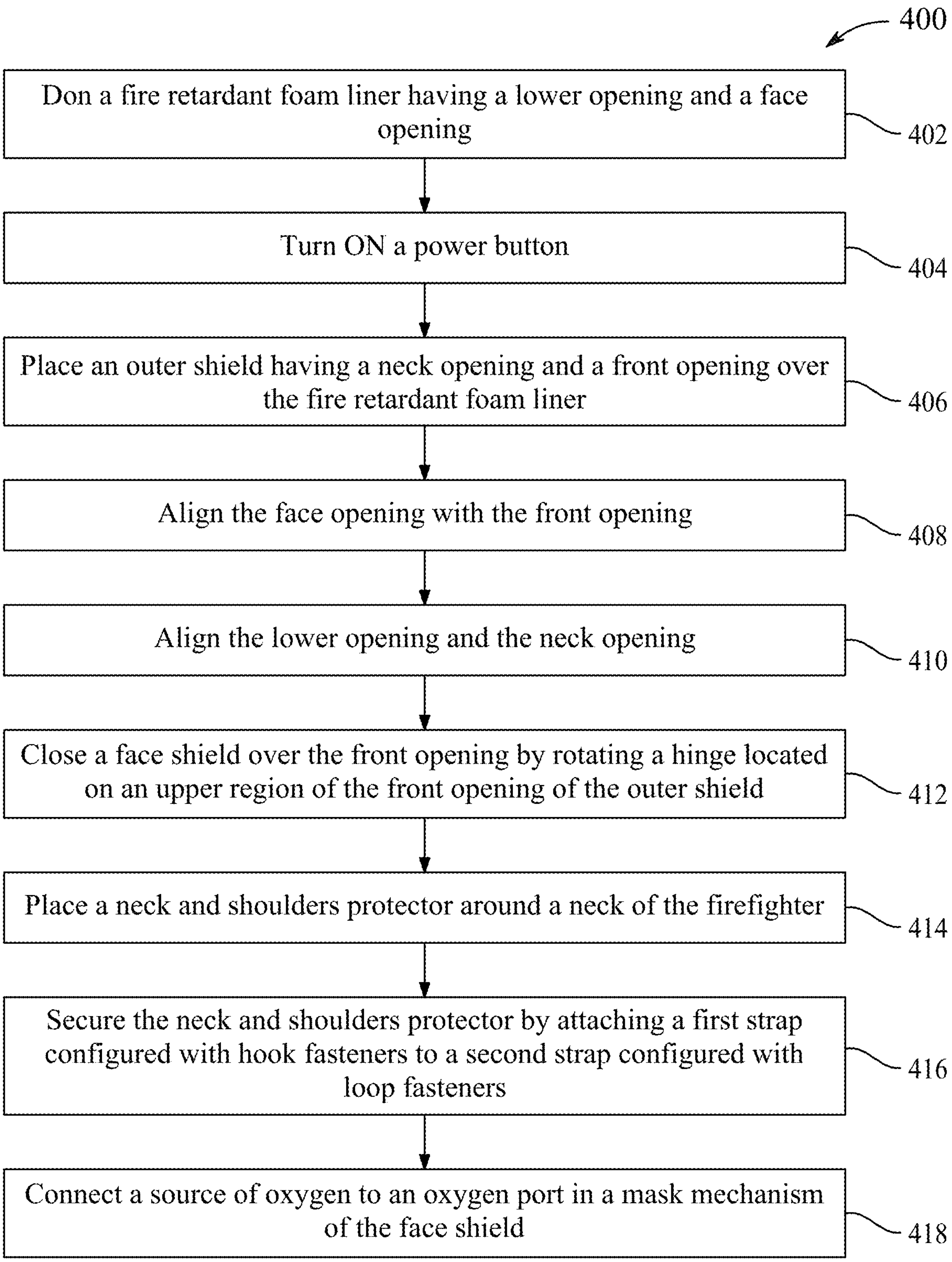
FIG. 4 is an exemplary flow chart depicting a method of using the safety helmet by a firefighter, according to certain aspects.

FIG. 4 illustrates an exemplary flow chart depicting a method 400 of using the safety helmet 100 by the firefighter. The order in which the method 400 is described is not intended to be construed as a limitation, and any number of the described method steps can be combined in any order to implement the method 400. Additionally, individual steps may be removed or skipped from the method 400 without departing from the spirit and scope of the present disclosure.

At step 402, the method 400 includes donning the fire-retardant foam liner 108 having the lower opening 108A and the face opening 108B. In particular, the lower opening 108A is configured to allow a head of the wearer to pass through and the face opening 108B is configured for a secure fit around a facial structure of the wearer to ensure maximum fire protection. The fire-retardant foam liner 108 serves as a secondary fire protection option for the wearer, as well as provides a cushioning to the wearer for elongated use.

At step 404, the method 400 includes activating the safety helmet 100 by turning ON the power button 146. The power button 146 is operatively configured to transmit an electrical signal to the microcontroller 140, thereby initiating the operational functionalities of the safety helmet 100. Upon activation, the microcontroller 140 controls and coordinates various features of the safety helmet 100, including but not limited to, the particulate air filter 116, the LED light strip 118, the HUD 150, and the speaker and microphone unit 126. The power required to operate the aforementioned functionalities is derived from the rechargeable battery 138, which is integrated within the safety helmet 100. In some aspects, the power button 146 may be strategically positioned on the outer shield 102 or another accessible location to facilitate ease of use by the wearer, while wearing gloves or other protective gear. The power button 146 may be designed to provide tactile or visual feedback upon activation, confirming successful engagement and commencement of operations. In some implementations, the power button 146 may be integrated with a fail-safe mechanism to prevent unintentional activation or deactivation, enhancing the safety and reliability of the safety helmet 100.

At step 406, the method 400 includes placing the outer shield 102 having the neck opening 102A and the front opening 102B, over the fire-retardant foam liner 108. The outer shield 102 is configured to encompass the fire-retardant foam liner 108. Further, at step 408, the method 400 includes aligning the face opening 108B of the fire-retardant foam liner 108 with the front opening 102B of the outer shield 102. Furthermore, at step 410 the method 400 includes aligning the lower opening 108A of the fire-retardant foam liner 108 and the neck opening 102A of the outer shield 102, in order to facilitate integration of the outer shield 102 and the fire-retardant foam liner 108. The outer shield 102 serves as the primary protective layer, providing durability, thermal resistance, and impact protection to the wearer. The interior surface of the outer shield 102 is operatively equipped with several integral components, including but not limited to the rechargeable battery 138, the microcontroller 140, the power button 146, and the wiring harness 148. The aforementioned integral components are positioned within the outer shield 102 to provide desired operational efficiency, and protection against environmental hazards. In certain aspects, the placement of the outer shield 102 over the fire-retardant foam liner 108 may involve mechanical or adhesive fastening to maintain structural integrity and stability during operation. The neck opening 102A and front opening 102B of the outer shield 102 are configured to allow unobstructed use of associated features such as the mask body 122, the particulate air filter 116, and the regulator nose cone 128.

At step 412, the method 400 includes closing the face shield 106 over the front opening 102B of the outer shield 102 by rotating the hinge 104, located on the upper region of the front opening 102B of the outer shield 102. The hinge 104 is connected to the face shield 106, mechanically and rotatably. The rotation of the hinge 104 provides a controlled movement of the face shield 106, for transitioning between an open position and a closed position. In the closed position, the face shield 106 forms a protective barrier over the front opening 102B of the outer shield 102, which may shield the wearer from external hazards, including heat, particulate matter, and debris. The hinge 104 is configured to provide frictionless rotational movement and may include mechanical features such as detents or locking mechanisms to secure the face shield 106 in the desired position, whether open, closed, or partially closed. The hinge 104 may also include wear-resistant materials or lubrication to ensure longevity and reliability during repeated use. In certain aspects, the closure of the face shield 106 may also activate secondary functionalities, such as sealing mechanisms to enhance air filtration via the particulate air filter 116 or activating the HUD 150 within the safety helmet 100.

At step 414, the method 400 includes placing the neck and shoulders protector 132 around a neck of the firefighter and at step 416, the method 400 includes securing the neck and shoulders protector 132 by attaching the first strap 134, configured with hook fasteners, to the second strap 136, configured with loop fasteners. The neck and shoulders protector 132 is positioned around the neck of the wearer, such as the firefighter, to provide comprehensive protection against environmental hazards including heat, debris, and particulate matter. The neck and shoulders protector 132 is configured to conform ergonomically to the anatomical structure of the wearer, providing a secure and comfortable fit while maintaining flexibility and mobility during use. The hook-and-loop fastening mechanism as described in step 416 may provide a secure attachment, allowing for quick and easy adjustment to accommodate varying neck sizes. As described earlier, the neck and shoulders protector 132 may include fire-retardant materials to provide enhanced thermal resistance, as well as moisture-wicking properties to improve comfort during extended use. Additionally, the fastening mechanism may be designed to prevent accidental detachment during critical operations, providing reliability in firefighting or rescue missions.

At step 418, the method 400 includes connecting the source of oxygen to the oxygen port 124 in the mask mechanism 120 of the face shield 106. The oxygen port 124 is configured to receive and securely connect to the source of oxygen, such as a pressurized oxygen cylinder, through a standardized coupling mechanism. The connection process may involve an oxygen hose originating from the source of oxygen and pneumatically coupling with the oxygen port 124. In an aspect, the oxygen port 124 may be equipped with a quick-connect or threaded fitting to facilitate rapid and secure attachment. The connection is designed to withstand high-pressure oxygen flow and environmental stresses, ensuring uninterrupted supply during operation. The mask mechanism 120, which includes the oxygen port 124, directs the supplied oxygen into the mask body 122, where the oxygen may be delivered to the wearer through a controlled airflow mechanism. Furthermore, the safety helmet 100 include features such as the regulator nose cone 128 and the particulate air filter 116 to ensure the oxygen delivered is both purified and pressurized as required.

The method 400 further includes detecting, by the light sensor 155, the intensity of ambient light in the environment surrounding the safety helmet 100. The light sensor 155 may include a photodetector, operatively integrated within the safety helmet 100. The light sensor 155 generates a light intensity signal corresponding to the measured ambient light level and transmits the signal to the microcontroller 140, which is electrically connected to both the light sensor and a LED light strip 118 integrated into the safety helmet 100. The method 400 further includes receiving, by the microcontroller 140 electrically connected to the light sensor 155 and the LED light strip 118, the light intensity signal. Upon receiving the light intensity signal, the microcontroller 140 processes the signal to compare the detected ambient light level against a predefined light intensity threshold. If the light intensity signal indicates that the ambient light is below the threshold, the method 400 includes turning the LED light strip 118 ON, by the microcontroller 140 in order to enhance visibility for the wearer or to signal a presence of the wearer in low-light environments. Conversely, if the light intensity signal indicates that the ambient light is equal to or exceeds the threshold, the method 400 includes turning the LED light strip 118 OFF, by the microcontroller 140, in order to conserve power derived from the rechargeable battery 138. The integration of the light sensor, microcontroller 140, and the LED light strip 118 may provide adaptive lighting functionality which may be required for operational safety and efficiency of the safety helmet 100, particularly during firefighting or rescue missions in varying light conditions.

The method 400 further includes projecting, by the HUD 150, connected to the microcontroller 140, the visual overlay onto the transparent screen 112 of the face shield 106. The HUD 150 is configured to provide real-time visual information to the wearer by projecting data, alerts, or graphical elements onto the inner surface of the transparent screen 112 of the face shield 106. The projection may be achieved through an integrated optical system that receives input signals from the microcontroller 140, which processes data from various components of the safety helmet 100. The visual overlay may include critical information such as ambient temperature, oxygen supply levels, particulate concentration, or navigation aids, directly in the field of view of the firefighter, ensuring that the wearer remains informed about the surroundings and operational status without requiring external devices. In certain aspects, the HUD 150 may utilize adaptive brightness controlled by the microcontroller 140, based on input from the light sensor 155, to ensure optimal visibility in varying light conditions. In addition, certain information for the HUD 150 may be derived from the first and the second forward facing thermal cameras 154A, 154B. As such, the method 400 further includes measuring, by the first forward facing thermal camera 154A and the second forward facing thermal camera 154B, electrically connected to the microcontroller 140, an ambient temperature in the environment surrounding the safety helmet 100. The first and the second forward facing thermal cameras 154A, 154B are configured to continuously monitor the temperature and generate corresponding thermal imaging data. When the ambient temperature exceeds the threshold temperature, as determined by the microcontroller 140, the method 400 includes recording infrared images of the environment. The method 400 further includes transmitting the infrared images and temperature data to the HUD 150 and projecting, by the HUD 150, a real-time infrared display of the environment onto the transparent screen 112. The visual overlay provides the wearer with thermal imaging of the environment, enabling enhanced visibility of heat sources, objects, or potential victims that may not be visible to the naked eye under normal conditions, such as in smoke-filled or low-visibility environments. The visual display ensures that all vital visual information is centralized and easily accessible during firefighting operations.

The method 400 further includes measuring ambient oxygen levels, with the oxygen sensor 124A connected between the mask mechanism 120 and an air valve integrated into the oxygen port 124. The oxygen sensor 124A is electrically connected to the microcontroller 140 and is configured to continuously monitor the ambient oxygen concentration to ensure the safety and functionality of oxygen delivery system. Based on the detected oxygen levels, the microcontroller 140 actuates the air valve to regulate the flow of oxygen into the mask mechanism 120. The actuation ensures that sufficient oxygen is supplied to the wearer, particularly in low-oxygen environments. Further, when the oxygen sensor 124A detects airflow through the air valve, the method 400 includes pressing the mask body 122 against the mask mechanism 120 using the sealing arm 130 located within the regulator nose cone 128. The sealing arm 130 is mechanically actuated to create a secure and airtight connection between the mask body 122 and the mask mechanism 120, preventing the ingress of external contaminants such as particulate matter or toxic gases. The microcontroller 140 coordinates the actuation of the air valve and the sealing arm 130 to maintain optimal oxygen delivery and ensure wearer safety. The oxygen sensor 124A, integrated within the mask mechanism 120, is configured to transmit real-time oxygen level data to the HUD 150 for projection onto the transparent screen 112 of the face shield 106, allowing the wearer to monitor oxygen levels during operation.

Figure 5A:
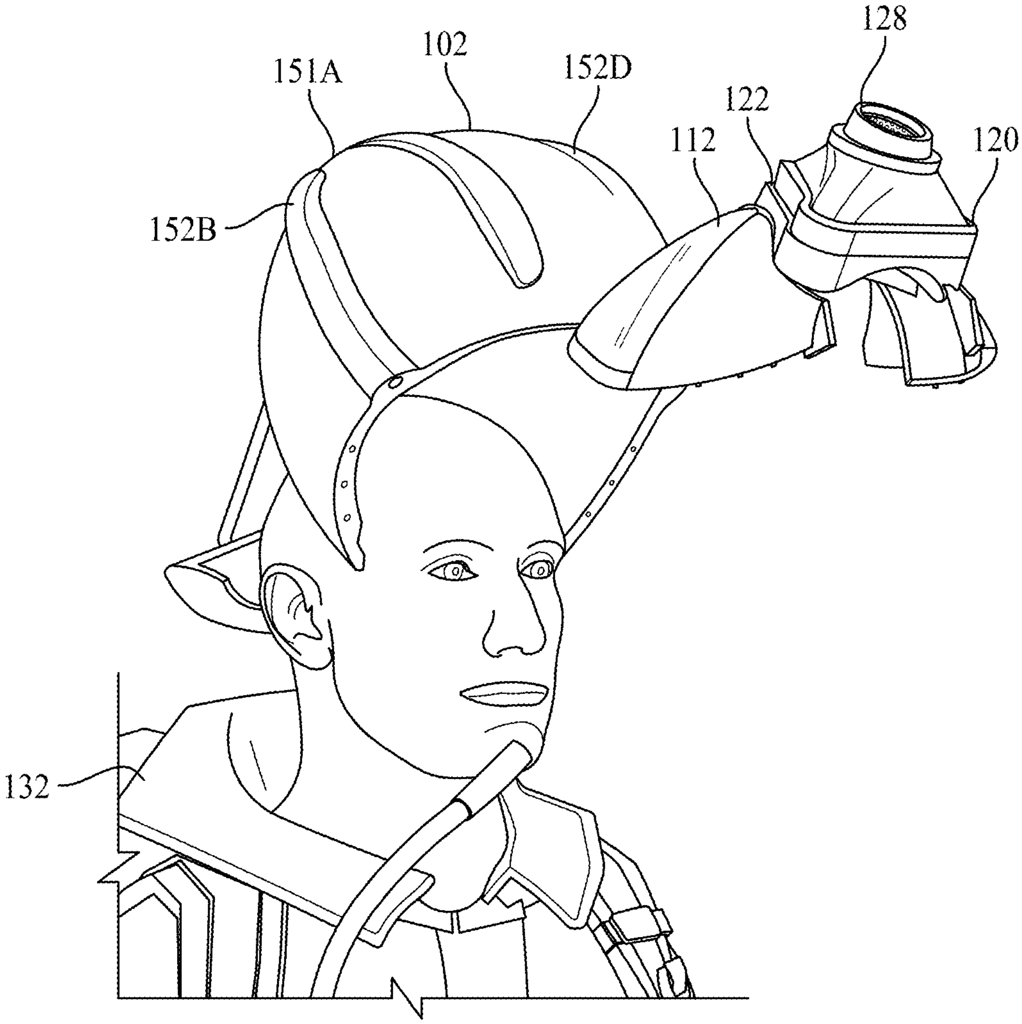
FIG. 5A illustrates an exemplary schematic perspective view of an initial stage of donning the safety helmet, according to certain aspects.
Figure 5B:
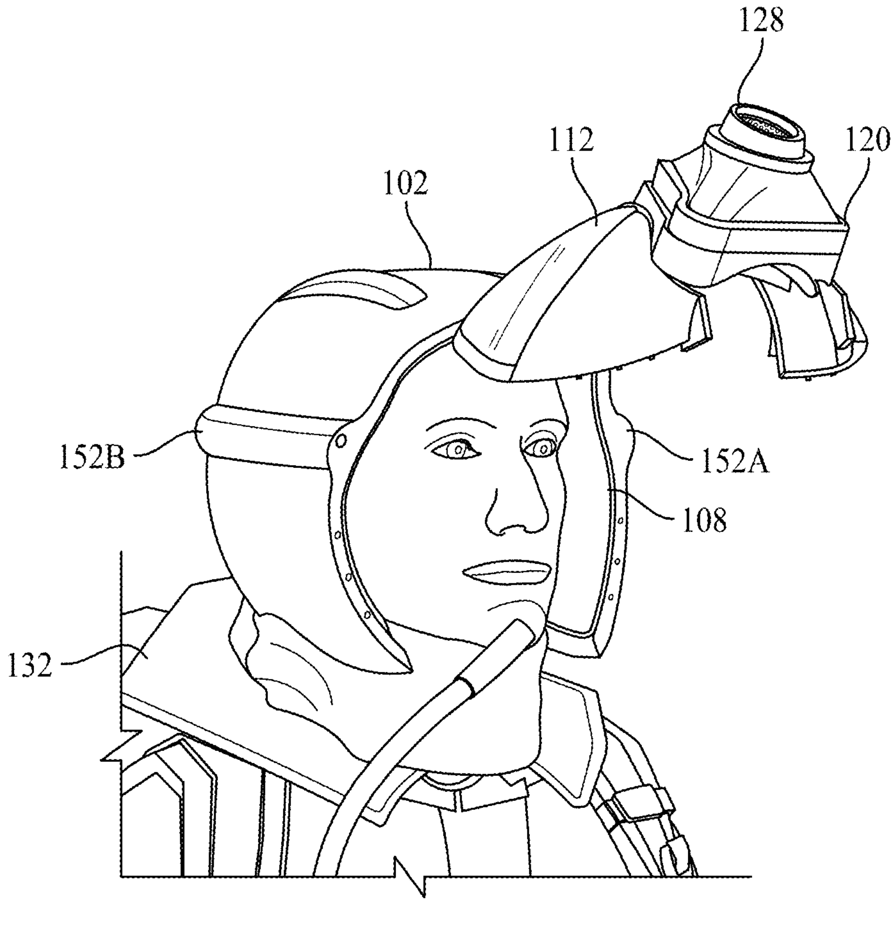
FIG. 5B illustrates an exemplary schematic perspective view of an intermediate stage of donning the safety helmet, according to certain aspects.
Figure 5C:
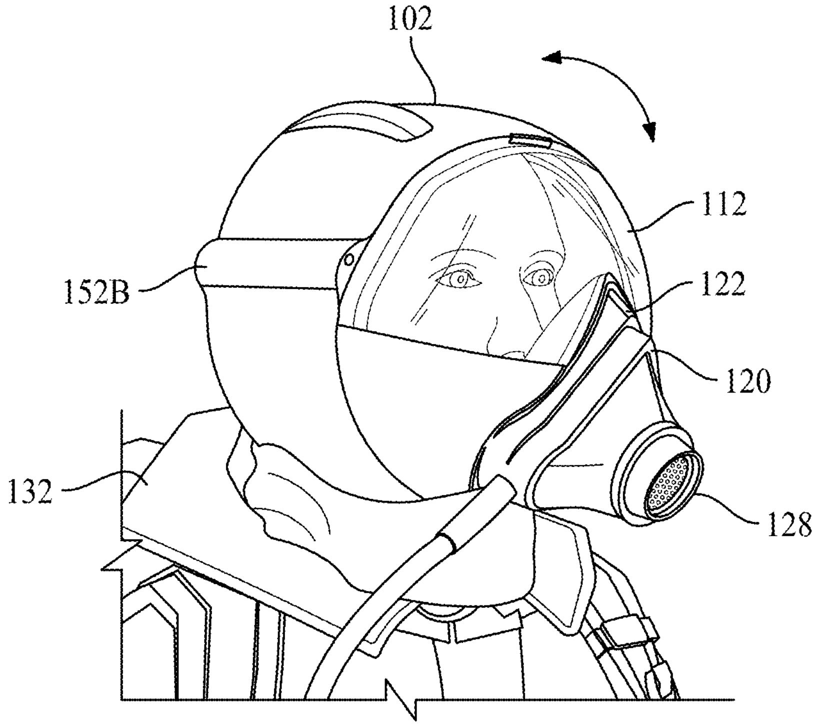
FIG. 5C illustrates an exemplary schematic perspective view of a final stage of donning the safety helmet, according to certain aspects.

FIG. 5A, FIG. 5B, and FIG. 5C are illustrations which illustrate the method 400. In particular, FIGS. 5A-5C illustrate various stages of the method 400 for donning and securing the safety helmet 100, as disclosed in the preceding aspects. FIGS. 5A-5C depict the sequential process by which the safety helmet 100 is secured for operational use, with reference to structural components and functional elements. Referring to FIG. 5A, the initial step of donning the safety helmet 100 involves placing the safety helmet 100 on the head of the wearer. During this step, the outer shield 102 is positioned such that the neck opening 102A accommodates the neck of the wearer, while the fire-retardant foam liner 108 ensures a secure and ergonomic fit around the head. The neck and shoulders protector 132 is preliminarily arranged around the neck of the wearer to provide thermal and physical protection, as disclosed in step 414 of the method 400. At this stage, the face shield 106 remains in the open position, allowing unobstructed access to align and adjust the safety helmet 100.

In FIG. 5B, the safety helmet 100 is shown with the face shield 106 in the open position after the safety helmet 100 has been fully donned. The hinge 104, positioned on the upper region of the front opening 102B of the outer shield 102, allows the face shield 106 to rotate freely, providing access to the mask mechanism 120, which includes the oxygen port 124 and the particulate air filter 116. The intermediate configuration as shown in FIG. 5B, allows the wearer to connect an external oxygen source to the oxygen port 124, as described in step 418 of method 400, and to verify proper placement of the internal components, such as the microcontroller 140 and the LED light strip 118, before securing the safety helmet 100. Further, FIG. 5C depicts the safety helmet 100 in a fully secured and operational state. The face shield 106 is rotated downward via the hinge 104 and locked into place over the front opening 102B, forming a protective barrier and sealing the mask body 122 against external contaminants. The neck and shoulders protector 132 is secured by attaching the first strap 134, configured with hook fasteners, to the second strap 136, configured with loop fasteners, as detailed in step 416 of method 400. The microcontroller 140 is powered on via the power button 146, initiating all integrated functionalities, including the HUD 150, the LED light strip 118, and the speaker and microphone unit 126. At this stage, the microcontroller may communicate with the computing application in the cloud server to receive updates or environmental information as discussed above. FIGS. 5A-5C illustrate the complete donning process of the safety helmet 100, demonstrating the sequential engagement of associated components.

The aspects of the present disclosure provide the safety helmet 100 configured for use in hazardous operational environments. The safety helmet 100 includes structural and functional elements operatively integrated to provide thermal and physical protection while enhancing operational capabilities. The safety helmet 100 incorporates a plurality of modular components, including the HUD 150, forward-facing thermal cameras 154A, 154B, the particulate air filter 116, the sealing arm 130, each operatively connected and configured to facilitate real-time environmental monitoring, adaptive functionality, and enhanced situational awareness. The microcontroller 140, operatively coupled with the rechargeable battery 138 and the wiring harness 148, facilitates seamless interaction between the sensors, display systems, and communication units. The safety helmet 100 is further configured for ergonomic adaptability, with features such as a hook-and-loop fastened neck and shoulders protector 132 and an adjustable outer shield 102, ensuring compatibility with varying user requirements and operational scenarios. The disclosed safety helmet 100 is particularly suited for applications necessitating high levels of protection, reliability, and operational efficiency, including but not limited to firefighting, search and rescue, and emergency response operations.

A first embodiment describes a safety helmet 100 for a firefighter, comprising an outer shield 102 having a neck opening 102A and a front opening 102B, a hinge 104 located on an upper region of the front opening 102B of the outer shield 102, a fire-retardant foam liner 108 having a lower opening 108A and a face opening 108B, where the fire-retardant foam liner 108 is configured to fit within the outer shield 102, where the fire-retardant foam liner 108 is configured to extend past the neck opening 102A; a face shield 106 including a sensor carrier 110 attached to the hinge 104, where the sensor carrier 110 has a shape configured to conform to the front opening 102B, a transparent screen 112 having a helmet facing edge 112A configured to conform to the sensor carrier 110 and a forward facing edge 112B configured with a tapered nose opening 114, a particulate air filter 116 connected to a lower edge 112C of the transparent screen 112, a light emitting diode (LED) light strip 118 located between the sensor carrier 110 and the helmet facing edge 112A of the transparent screen 112, a mask mechanism 120 configured to attach to the tapered nose opening 114 of the transparent screen 112 and the particulate air filter 116, a heads-up display (HUD) 150 connected to an upper region of a proximal edge of the mask mechanism 120 which faces the tapered nose opening 114, where the HUD 150 is configured to project a visual overlay onto the transparent screen 112; an oxygen port 124 connected to the mask mechanism 120, a mask body 122 connected to a proximal edge of the mask mechanism 120, a speaker and microphone unit 126 attached to the mask body 122, and a regulator nose cone 128 connected to the distal edge of the mask body 122.

In an aspect, the safety helmet 100 further comprises a neck and shoulders protector 132 made of heat resistant, penetration resistant fiber, where the neck and shoulders protector 132 includes a neck protection region 132A and a shoulder protection region 132B, where the neck protection region 132A has a first strap 134 and a second strap 136, where each strap includes a strip of hook and loop fastener configured to lock the neck and shoulders protector 132 when connected.

In an aspect, the safety helmet 100 further comprises a rechargeable battery 138 attached to an inner surface of the outer shield 102, a microcontroller 140 operatively connected to the rechargeable battery 138, where the microcontroller 140 includes electrical circuitry, a memory 142 storing program instructions and at least one processor 144 configured to execute the program instructions, a power button 146 connected to the microcontroller 140, and a wiring harness 148 having a plurality of electrical terminals connected to the microcontroller 140.

In an aspect, the outer shield 102 has an oval shape truncated by the neck opening 102A, a top 151A, a first side 151B, a second side 151C opposite the first side 151B and a back side 151D opposite the front opening 102B, where a central axis 'A' extends from the top 151A to the neck opening 102A, wherein the outer shield 102 further comprises a first thickened band 152A located on the first side 151B about one-half of a distance from the top 151A of the outer shield 102 and the neck opening 102A, wherein the first thickened band 152A extends from the back side 151D to the front opening 102B, a second thickened band 152B located on the second side 151C about one-half of a distance from the top 151A of the outer shield 102 and the neck opening 102A, where the second thickened band 152B extends from the back side 151D to the front opening 102B, and a wiring channel located within the second thickened band 152B, wherein the wiring channel is configured to contain a plurality of wires of the wiring harness 148.

In an aspect, the hinge 104 is a power transfer hinge electrically connected to the plurality of wires and the sensor carrier 110.

In an aspect, the sensor carrier 110 includes a first forward facing thermal camera 154A configured to cover an end of first thickened band 152A located on the front opening 102B on the first side 151B and a second forward facing thermal camera 154B configured to cover an end of second thickened band 152B located on the front opening 102B on the second side 151C, where each forward facing thermal camera is configured to measure an ambient temperature in an environment surrounding the sensor carrier 110, turn on when the ambient temperature exceeds a threshold temperature, record infrared images of the environment and project a real-time infrared display of the environment onto the transparent screen, wherein the first forward facing thermal camera 154A and the second forward facing thermal camera 154B are electrically connected to a first set and a second set respectively of the plurality of wires of the wiring harness through the hinge.

In an aspect, the sensor carrier 110 further includes a light sensor 155 electrically connected by a third set of wires of the plurality of wires to the microcontroller 140 through the hinge 104, where the light sensor 155 is configured to detect an intensity of an ambient light in an environment surrounding the light sensor 155 and generate a light intensity signal.

In an aspect, the LED light strip 118 is electrically connected by a fourth set of wires of the plurality of wires to the microcontroller 140 through the power transfer hinge, where the microcontroller 140 is configured to receive the light intensity signal, turn the LED light strip 118 ON when the light intensity signal is below a light intensity threshold and turn the LED light strip 118 OFF when the light intensity signal is greater than or equal to the light intensity threshold.

In an aspect, the HUD 150 is electrically connected by a fifth set of wires of the plurality of wires to the microcontroller 140 through the hinge 104.

In an aspect, the HUD 150 incorporates the temperature measurements from the first forward facing thermal camera 154A and the second forward facing thermal camera 154B, a location of the firefighter within a building, a location of other firefighters, a location of a victim, a navigation aid, a time, readings by an oxygen sensor 124A located in the oxygen port 124, light intensity measurements and the infrared images into the visual overlay.

In an aspect, the speaker and microphone unit 126 is electrically connected by a sixth set of wires of the plurality of wires through the hinge 104 to the microcontroller 140.

In an aspect, the safety helmet 100 further comprises the oxygen sensor 124A connected between the mask mechanism and an air valve 124B in the oxygen port 124, where the oxygen sensor 124A is configured to measure ambient oxygen levels and actuate the air valve 124B based on the ambient oxygen levels.

In an aspect, the safety helmet 100 further comprises a sealing arm 130 located within the regulator nose cone 128, where the sealing arm 130 is configured to press the mask body 122 against the mask mechanism 120 when the oxygen sensor 124A detects air flow through the air valve 124B.

In an aspect, the particulate air filter 116 is a high-efficiency particulate air (HEPA) filter.

In an aspect, the safety helmet 100 further comprises a gasket 117 located between the lower edge 112C of the transparent screen 112 and the particulate air filter.

A second embodiment describes a method 400 of using a safety helmet 100 by a firefighter, the method 400 comprises donning a fire-retardant foam liner 108 having a lower opening 108A and a face opening 108B turning ON a power button 146, placing an outer shield 102 having a neck opening 102A and a front opening 102B over the fire-retardant foam liner 108, where an interior surface of the outer shield 102 includes a rechargeable battery 138, a microcontroller 140, the power button 146 and an internal wiring harness 148, aligning the face opening 108B with the front opening 102B, aligning the lower opening 108A and the neck opening 102A, closing a face shield 106 over the front opening 102B by rotating a hinge 104 located on an upper region of the front opening 102B of the outer shield 102, where the hinge 104 is connected to the face shield 106; placing a neck and shoulders protector 132 around a neck of the firefighter, securing the neck and shoulders protector 132 by attaching a first strap 134 configured with hook fasteners to a second strap 136 configured with loop fasteners, and connecting a source of oxygen to an oxygen port 124 in a mask mechanism 120 of the face shield 106.

In an aspect, the method 400 further comprises detecting, by a light sensor 155, an intensity of an ambient light in an environment surrounding the safety helmet 100 and generating a light intensity signal, receiving, by a microcontroller 140 electrically connected to the light sensor 155 and a light emitting diode (LED) light strip 118, the light intensity signal, turning the LED light strip 118 ON, by the microcontroller 140, when the light intensity signal is below a light intensity threshold, and turning the LED light strip 118 OFF, by the microcontroller 140, when the light intensity signal is greater than or equal to the light intensity threshold.

In an aspect, the method 400 further comprises projecting, by a heads-up display (HUD) 150 connected to the microcontroller 140, a visual overlay onto a transparent screen 112 of the face shield 106.

In an aspect, the method 400 further comprises measuring, by a first forward facing thermal camera 154A and a second forward facing thermal camera 154B electrically connected to the microcontroller 140, an ambient temperature in an environment surrounding the surrounding the safety helmet 100, recording, when the ambient temperature exceeds a threshold temperature, infrared images of the environment, and transmitting the infrared images and temperature to the HUD 150; and projecting, by the HUD 150, a real-time infrared display of the environment onto the transparent screen 112.

In an aspect, the method 400 further comprises measuring, with an oxygen sensor 124A connected between the mask mechanism and an air valve 124B in the oxygen port, ambient oxygen levels, actuating the air valve 124B based on the ambient oxygen levels, pressing, by a sealing arm 130 located within a regulator nose cone 128 connected to the mask mechanism, a mask body 122 against the mask mechanism 120 when the oxygen sensor 124A detects air flow through the air valve 124B.

Figure 6:
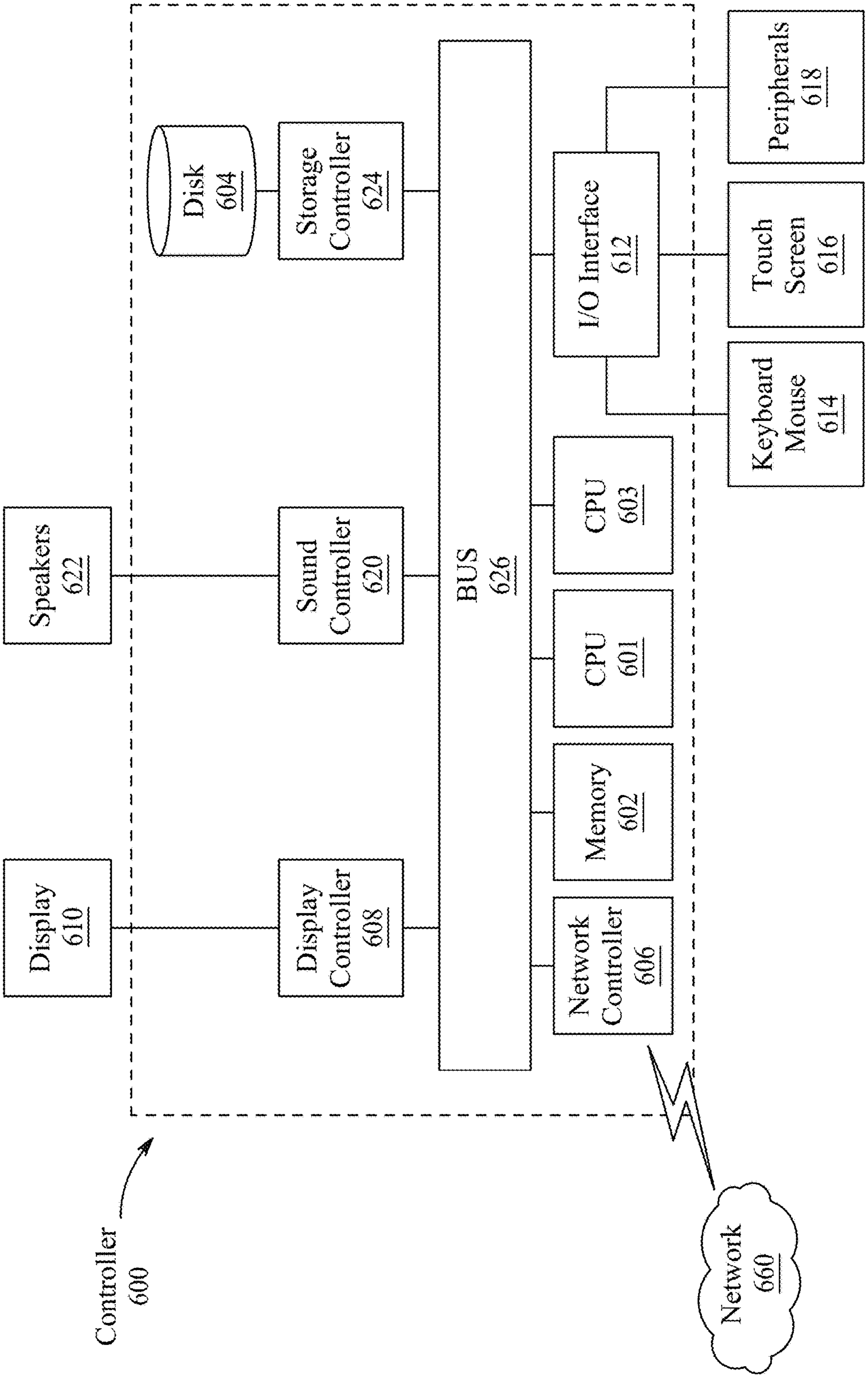
FIG. 6 is an illustration of a non-limiting example of details of computing hardware used in a microcontroller of the safety helmet, and a corresponding computing system, according to certain embodiments.

Next, further details of the hardware description of a computing environment according to exemplary embodiments is described with reference to FIG. 6. In FIG. 6, a controller 600 is described is representative of the microcontroller 140, the memory 142, and the at least one processor 144 of the safety helmet 100. The controller 600 is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general-purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
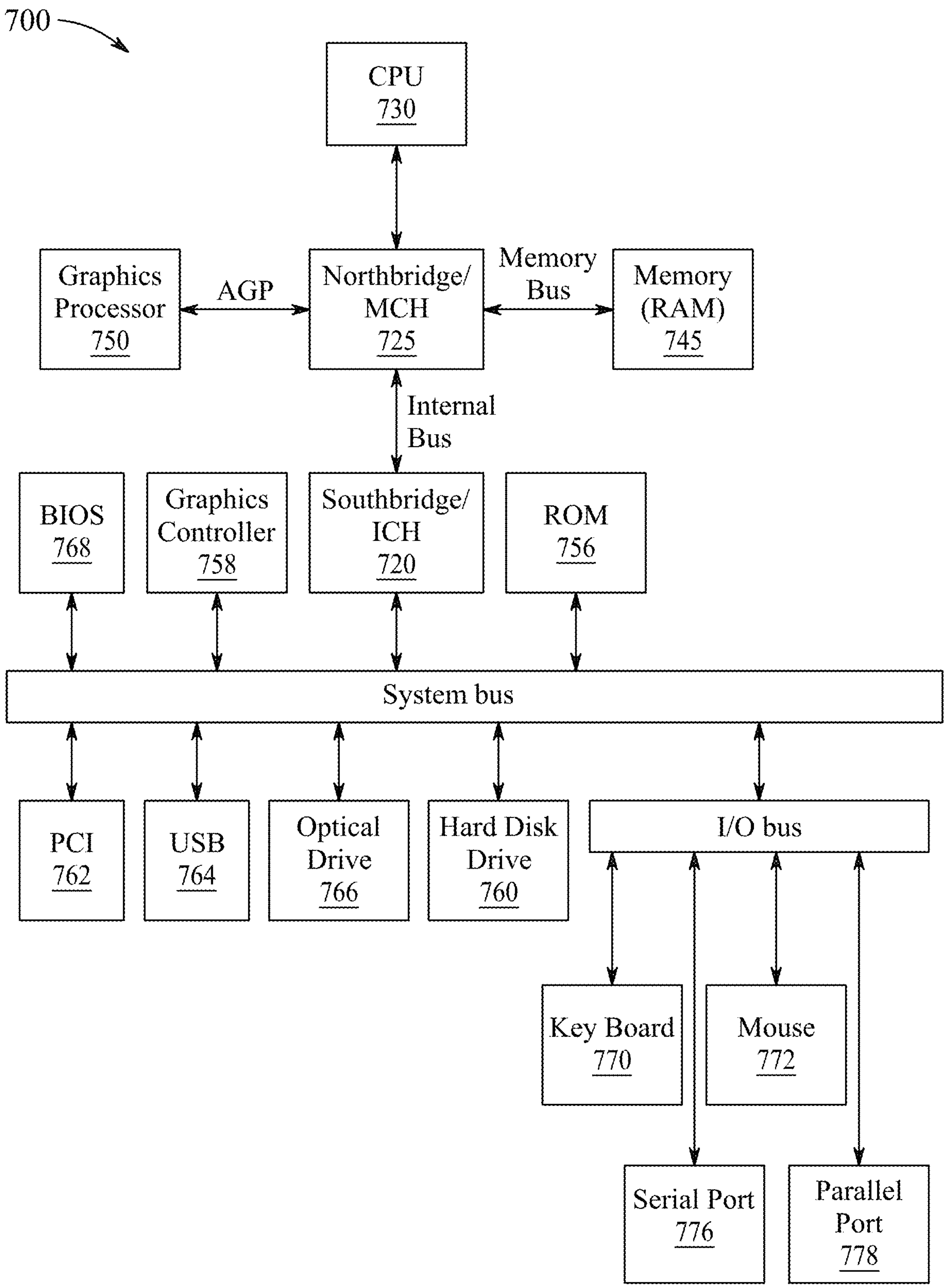
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
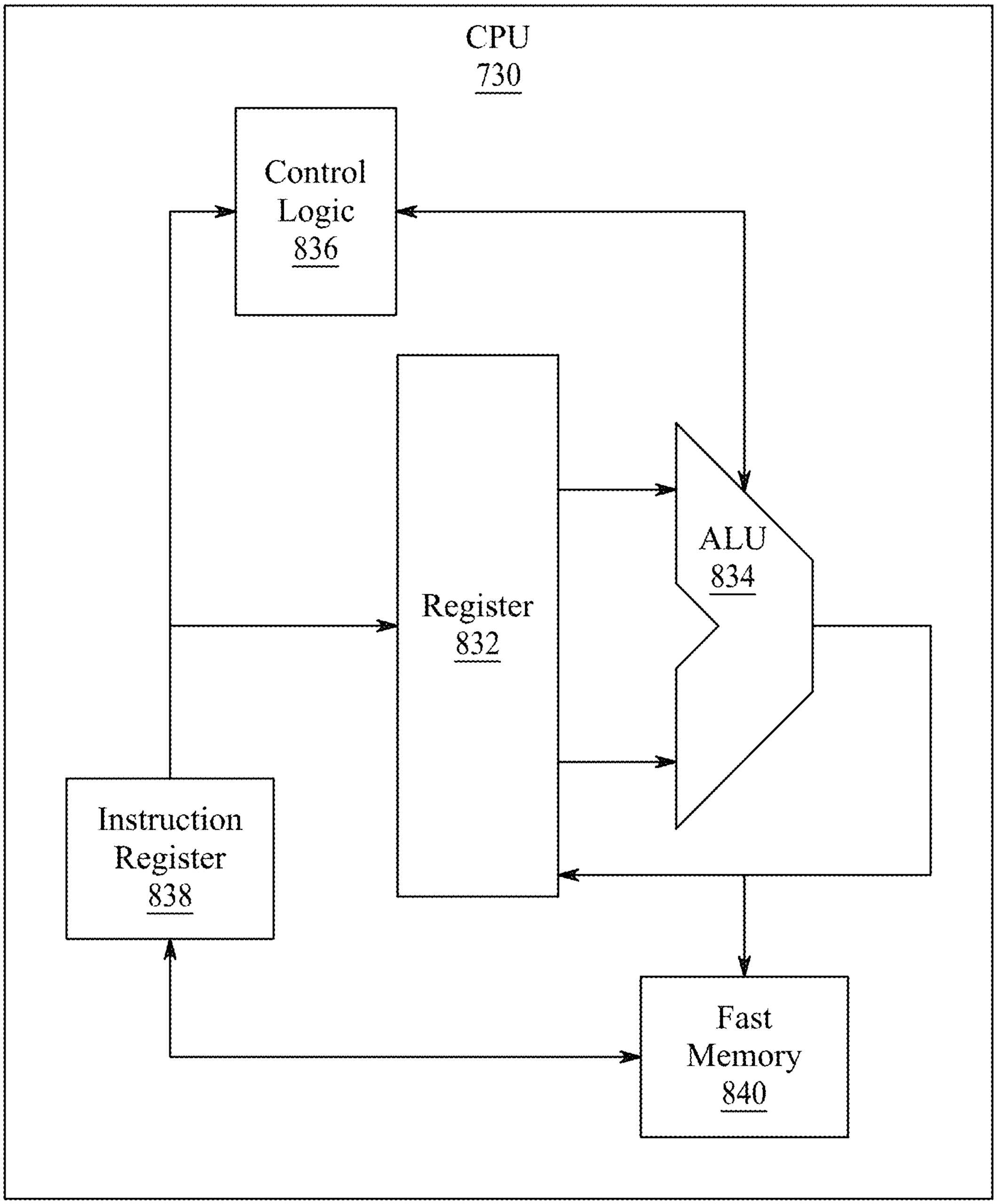
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 830. Part of the instructions can also be directed to the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
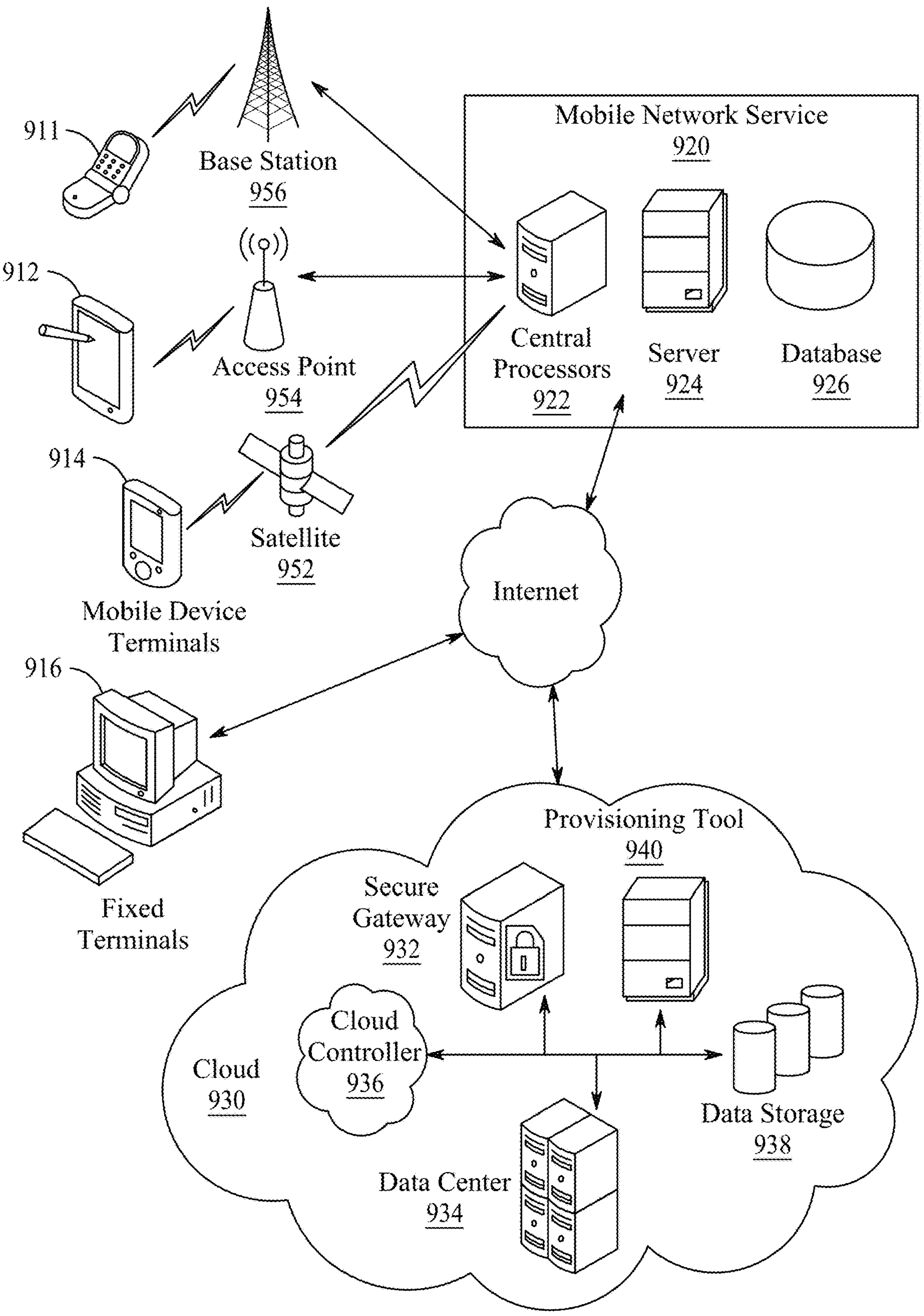
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 930 including a cloud controller 936, a secure gateway 932, a data center 934, data storage 938 and a provisioning tool 940, and mobile network services 920 including central processors 922, a server 924 and a database 926, which may share processing, as shown by FIG. 9, in addition to various human interface and communication devices (e.g., display monitors 916, smart phones 910, tablets 912, personal digital assistants (PDAs) 914). The network may be a private network, such as a LAN, satellite 952 or WAN 954, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A firefighter safety helmet system, comprising:
- an outer shield having a neck opening and a front opening;
- a hinge located on an upper region of the front opening of the outer shield;
- a fire-retardant foam liner having a lower opening and a face opening, wherein the fire-retardant foam liner is configured to fit within the outer shield, wherein the fire-retardant foam liner is configured to extend past the neck opening;
- a face shield including:
  - a sensor carrier attached to the hinge, wherein the sensor carrier has a shape configured to conform to the front opening;
  - a transparent screen having a helmet facing edge configured to conform to the sensor carrier and a forward-facing edge configured with a tapered nose opening;
  - a particulate air filter connected to a lower edge of the transparent screen;
  - a light emitting diode (LED) light strip located between the sensor carrier and the helmet facing edge of the transparent screen;
  - a mask mechanism configured to attach to the tapered nose opening of the transparent screen and the particulate air filter;
  - a heads-up display (HUD) connected to an upper region of a proximal edge of the mask mechanism which faces the tapered nose opening, wherein the HUD is configured to project a visual overlay onto the transparent screen;
  - an oxygen port connected to the mask mechanism;
  - a mask body connected to a distal edge of the mask mechanism;
  - a speaker and microphone unit attached to the mask body; and
  - a regulator nose cone connected to the distal edge of the mask body; and
- a fabric neck and shoulders protector configured for positioning around the neck and on the shoulders, wherein the neck and shoulders protector has a neck protection region and a shoulder protection region.

2. The firefighter safety helmet system of claim 1, further comprising:
- a rechargeable battery attached to an inner surface of the outer shield;
- a microcontroller operatively connected to the rechargeable battery, wherein the microcontroller includes electrical circuitry, a memory storing program instructions and at least one processor configured to execute the program instructions;
- a power button connected to the microcontroller; and
- a wiring harness having a plurality of electrical terminals connected to the microcontroller.

3. The firefighter safety helmet system of claim 2, wherein the outer shield has an oval shape truncated by the neck opening, a top, a first side, a second side opposite the first side and a back side opposite the front opening, wherein a central axis extends from the top to the neck opening, wherein the outer shield further comprises:
- a first thickened band located on the first side about one-half of a distance from the top of the outer shield and the neck opening, wherein the first thickened band extends from the back side to the front opening;

a second thickened band located on the second side about one-half of a distance from the top of the outer shield and the neck opening, wherein the second thickened band extends from the back side to the front opening; and a wiring channel located within the second thickened band, wherein the wiring channel is configured to contain a plurality of wires of the wiring harness.

4. The firefighter safety helmet system of claim 3, wherein the hinge is a power transfer hinge electrically connected to the plurality of wires and the sensor carrier.

5. The firefighter safety helmet system of claim 4, wherein the sensor carrier includes:

a first forward facing thermal camera configured to cover an end of first thickened band located on the front opening on the first side and a second forward facing thermal camera configured to cover an end of second thickened band located on the front opening on the second side, wherein each forward facing thermal camera is configured to measure an ambient temperature in an environment surrounding the sensor carrier, turn on when the ambient temperature exceeds a threshold temperature, record infrared images of the environment and project a real-time infrared display of the environment onto the transparent screen, wherein the first forward facing thermal camera and the second forward facing thermal camera are electrically connected to a first set and a second set respectively of the plurality of wires of the wiring harness through the hinge.

6. The firefighter safety helmet system of claim 5, wherein the sensor carrier further includes a light sensor electrically connected by a third set of wires of the plurality of wires to the microcontroller through the power transfer hinge, wherein the light sensor is configured to detect an intensity of an ambient light in an environment surrounding the light sensor and generate a light intensity signal.

7. The firefighter safety helmet system of claim 6, wherein the LED light strip is electrically connected by a fourth set of wires of the plurality of wires to the microcontroller through the power transfer hinge, wherein the microcontroller is configured to receive the light intensity signal, turn the LED light strip ON when the light intensity signal is below a light intensity threshold and turn the LED light strip OFF when the light intensity signal is greater than or equal to the light intensity threshold.

8. The firefighter safety helmet system of claim 7, wherein the HUD is electrically connected by a fifth set of wires of the plurality of wires to the microcontroller through the power transfer hinge.

9. The firefighter safety helmet system of claim 8, wherein the HUD incorporates the temperature measurements from the first forward facing thermal camera and the second forward facing thermal camera, a location of the firefighter within a building, a location of other firefighters, a location of a victim, a navigation aid, a time, readings by the oxygen sensor located in the oxygen port, light intensity measurements and the infrared images into the visual overlay.

10. The firefighter a safety helmet system of claim 8, wherein the speaker and microphone unit is electrically connected by a sixth set of wires of the plurality of wires through the power transfer hinge to the microcontroller.

11. The firefighter safety helmet system of claim 1, further comprising:

an oxygen sensor connected between the mask mechanism and an air valve in the oxygen port, wherein the oxygen sensor is configured to measure ambient oxygen levels and actuate the air valve based on the ambient oxygen levels.

12. The firefighter safety helmet system of claim 11, further comprising a sealing arm located within the regulator nose cone, wherein the sealing arm is configured to press the mask body against the mask mechanism when the oxygen sensor detects air flow through the air valve.

13. The firefighter safety helmet system of claim 1, wherein the particulate air filter is a high-efficiency particulate air (HEPA) filter.

14. The firefighter safety helmet system of claim 1, further comprising a gasket located between the lower edge of the transparent screen and the particulate air filter.

* * * * *